United States Patent
Takenaka

(10) Patent No.: US 10,468,982 B2
(45) Date of Patent: Nov. 5, 2019

(54) SWITCHING POWER SUPPLY CIRCUIT, LOAD DRIVING DEVICE, AND LIQUID CRYSTAL DISPLAY DEVICE

(71) Applicant: Rohm Co., Ltd., Kyoto (JP)

(72) Inventor: Seiji Takenaka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 21 days.

(21) Appl. No.: 15/409,699

(22) Filed: Jan. 19, 2017

(65) Prior Publication Data
US 2017/0213510 A1    Jul. 27, 2017

(30) Foreign Application Priority Data

Jan. 22, 2016  (JP) .................................. 2016-010831
Jan. 29, 2016  (JP) .................................. 2016-015330
Dec. 22, 2016  (JP) .................................. 2016-248907

(51) Int. Cl.
*H02M 3/156* (2006.01)
*H02M 3/158* (2006.01)
(Continued)

(52) U.S. Cl.
CPC ........... *H02M 3/156* (2013.01); *H02M 3/158* (2013.01); *G09G 3/36* (2013.01);
(Continued)

(58) Field of Classification Search
CPC ........ H02M 1/12; H02M 1/42; H02M 1/4225; H02M 1/4233; H02M 1/4241; H02M 1/4258; H02M 1/425; H02M 1/4208; H02M 3/156; H02M 3/158; H02M 3/1588; H02M 3/155; H02M 3/1582; H02M 3/157; H02M 3/1563; H02M 2001/0012;
(Continued)

(56) References Cited

U.S. PATENT DOCUMENTS

2008/0007233 A1* 1/2008 Hane ..................... H02M 3/156
 323/282
2014/0146426 A1* 5/2014 Murakami ....... H03K 19/00315
 361/56
(Continued)

FOREIGN PATENT DOCUMENTS

JP   2010-220355   9/2010
JP   2015-166870   9/2015

*Primary Examiner* — Yusef A Ahmed
*Assistant Examiner* — Bryan R Perez
(74) *Attorney, Agent, or Firm* — Fish & Richardson P.C.

(57) ABSTRACT

A switching power supply circuit has a switching output stage which generates an output voltage from an input voltage by driving a coil current by using an output transistor and a switching controller which turns ON and OFF the output transistor to keep the output voltage or a feedback voltage commensurate with it equal to a predetermined reference voltage. The switching controller includes a reference slope voltage generator which generates a reference slope voltage, a sense voltage holder which generates a held sense voltage by latching a sense voltage commensurate with the coil current with predetermined timing, and a voltage adder which generates a slope voltage by adding up the reference slope voltage and the held sense voltage. The switching controller determines the ON duty of the output transistor by using the slope voltage.

10 Claims, 21 Drawing Sheets

(51) Int. Cl.
 *H02M 1/00* (2006.01)
 *G09G 3/36* (2006.01)
(52) U.S. Cl.
 CPC . *G09G 2330/021* (2013.01); *G09G 2330/028* (2013.01); *H02M 2001/0009* (2013.01)
(58) Field of Classification Search
 CPC .... H02M 2001/0009; G09G 2330/021; G09G 2330/028; G09G 3/36
 See application file for complete search history.

(56) References Cited

U.S. PATENT DOCUMENTS

| | | | | |
|---|---|---|---|---|
| 2014/0320098 A1* | 10/2014 | Izumoto | ............... | H02M 3/156 323/282 |
| 2015/0098255 A1* | 4/2015 | Nate | ...................... | H02M 1/36 363/21.16 |
| 2015/0249385 A1* | 9/2015 | Takahashi | .............. | H05B 37/02 315/291 |

* cited by examiner

SWITCHING POWER SUPPLY CIRCUIT, LOAD DRIVING DEVICE, AND LIQUID CRYSTAL DISPLAY DEVICE

CROSS-REFERENCE TO RELATED APPLICATIONS

This application is based on the following Japanese patent applications, the contents of which are hereby incorporated by reference:

(1) Japanese Patent Application published as No. 2016-010831 (filed on Jan. 22, 2016)

(2) Japanese Patent Application published as No. 2016-015330 (filed on Jan. 29, 2016)

(3) Japanese Patent Application published as No. 2016-248907 (tiled on Dec. 22, 2017)

BACKGROUND OF THE INVENTION

1. Field of the Invention

The present invention relates to switching power supply circuits, load driving devices, and liquid crystal display devices.

2. Description of Related Art

Conventionally, as power supply means in a variety of applications, switching power supply circuits (for example, step-up switching power supply circuit, which produce an output voltage by stepping up an input voltage) are widely and commonly used. Methods for controlling switching power supply circuits include current mode control, which involves feedback control in accordance with both the output voltage and the coil current.

Examples of prior art related to what is mentioned above are seen in, for example, Japanese Patent Applications published as Nos. 2010-220355 and 2015-166870.

Inconveniently, however, switching power supply circuits adopting current mode control suffer variation of slope compensation ratio and of PWM (pulse width modulation) gain that accompanies variation of load.

On the other hand, conventional switching power supply circuits of a step-up type leave room for further improvement in line regulation characteristics and line step characteristics (line transient characteristics).

SUMMARY OF THE INVENTION

In view of the above-mentioned problems encountered by the present inventor, an object of the invention disclosed herein is to provide a switching power supply circuit that can keep slope compensation ratio and PWM gain constant against variation of load, or a switching power supply circuit that has good line regulation characteristics and line step characteristics, and also to provide a load driving device and a liquid crystal display device that employ such a switching power supply circuit.

To achieve the above object, according to one aspect of what is disclosed herein, a switching power supply circuit includes: a switching output stage configured to generate an output voltage from an input voltage by driving a coil current by using an output transistor; and a switching controller configured to turn ON and OFF the output transistor to keep the output voltage or a feedback voltage commensurate with it equal to a predetermined reference voltage. Here, the switching controller includes: a reference slope voltage generator configured to generate a reference slope voltage; a sense voltage holder configured to generate a held sense voltage by latching a sense voltage commensurate with the coil current with predetermined timing; and a voltage adder configured to generate a slope voltage by adding up the reference slope voltage and a held sense voltage. The switching controller is configured to determine the ON duty of the output transistor by using the slope voltage.

According to another aspect of what is disclosed herein, a switching power supply circuit includes: a switching output stage configured to generate an output voltage by stepping up an input voltage by turning ON and OFF an output transistor; and a switching controller configured to turn ON and OFF the output transistor. Here, the switching controller includes: an error amplifier configured to generate an error voltage commensurate with the difference between the output voltage or a feedback voltage commensurate with it and a predetermined reference voltage; a slope voltage generator configured to generate a slope voltage; and a comparator configured to determine the ON duty of the output transistor by comparing the error voltage with the slope voltage. The slope voltage generator is configured to vary the gradient of the slope voltage according to the reciprocal of the difference between the input voltage and the output voltage.

Other features, elements, steps, benefits, and characteristics of the present invention will become clearer with reference to the following description of preferred embodiments thereof in conjunction with the accompanying drawings.

DETAILED DESCRIPTION OF PREFERRED EMBODIMENTS

Figure 1:
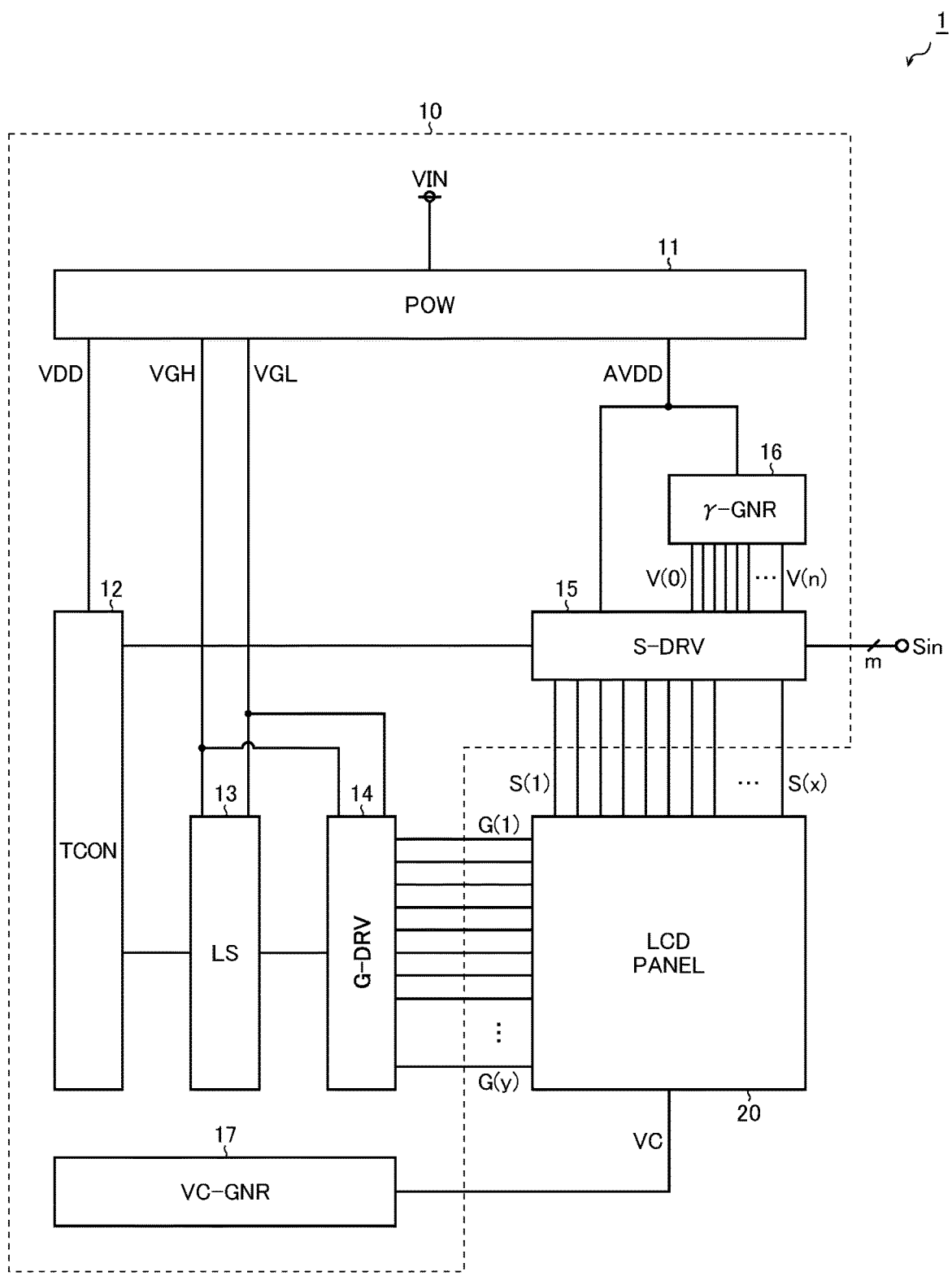
FIG. 1 is a block diagram showing one configuration example of a liquid crystal display device.

Liquid Crystal Display Device: FIG. 1 is a block diagram showing one configuration example of a liquid crystal display device. The liquid crystal display device 1 of this configuration example includes a liquid crystal driving device 10 and a liquid crystal display panel 20. The liquid crystal driving device 10 is a load driving device that drives and controls the liquid crystal display panel 20 according to a video signal Sin and various commands fed in from an unillustrated host device (such as a microprocessor). The liquid crystal display panel 20 is a means for outputting video that uses liquid crystal elements as pixels, and is driven as the load of the liquid crystal driving device 10.

Liquid Crystal Driving Device: With reference to FIG. 1, the liquid crystal driving device 10 will be described in detail. The liquid crystal driving device 10 of this configuration example includes a system power supply 11, a timing controller 12, a level shifter 13, a gate driver 14, a source driver 15, a gamma voltage generator 16, and a common voltage generator 17.

The system power supply 11 operates by being fed with an input voltage VIN (for example, +12 V), and generates an analog system supply voltage AVDD (for example +17 V), logic system supply voltages VDD (for example, +3.3 V, +1.8 V, and +1.2 V), a positive supply voltage VGH (for example, +28 V), and a negative supply voltage VGL (for example, 12 V) to feed them to whichever parts of the device require them.

The timing controller 12 operates by being fed with the logic system supply voltage VDD, and engages in timing control of the liquid crystal driving device 10 (as by controlling vertical synchronization by the gate driver 14 and horizontal synchronization by the source driver 15).

The level shifter 13 operates by being fed with the positive supply voltage VGH and the negative supply voltage VGL, and shifts the level of a timing control signal (vertical synchronizing signal) fed from the timing controller 12 to deliver the result to the gate driver 14.

The gate driver 14 operates by being fed with the positive supply voltage VGH and the negative supply voltage VGL, and generates gate signals G(l) to G(y) for the liquid crystal display panel 20 based on the vertical synchronizing signal fed from the level shifter 13. The gate signals G(l) to G(y) are fed to the liquid crystal elements of the liquid crystal display panel 20 (in a case where the liquid crystal display panel 20 is of an active matrix type, to the gate terminals of the active elements connected to the liquid crystal elements respectively).

The source driver 15 operates by being fed with the analog system supply voltage AVDD, and converts a digital. (m-bit) video signal Sin fed from an unillustrated host device into analog source signals S(1) to S(x) to feed these to the liquid crystal elements of the liquid crystal display panel 20 (in a case where the liquid crystal display panel 20 is of an active matrix type, to the source terminals of the active elements connected to the liquid crystal elements respectively).

The gamma voltage generator 16 operates by being fed with the analog system supply voltage AVDD, and generates n (where $n=2^m-1$) different gradation signals V(0) to V(n) to feed these to the source driver 15. The gradation signals V(0) to V(n) correspond one to one to the data values "0" to "$2^m-1$" of the video signal Sin.

The common voltage generator 17 generates a predetermined common voltage VC, and feeds it to the liquid crystal elements of the liquid crystal display panel 20 (in a case where the liquid crystal display panel 20 is of an active matrix type, to the drain terminals of the active elements connected to the liquid crystal elements respectively).

Figure 2:
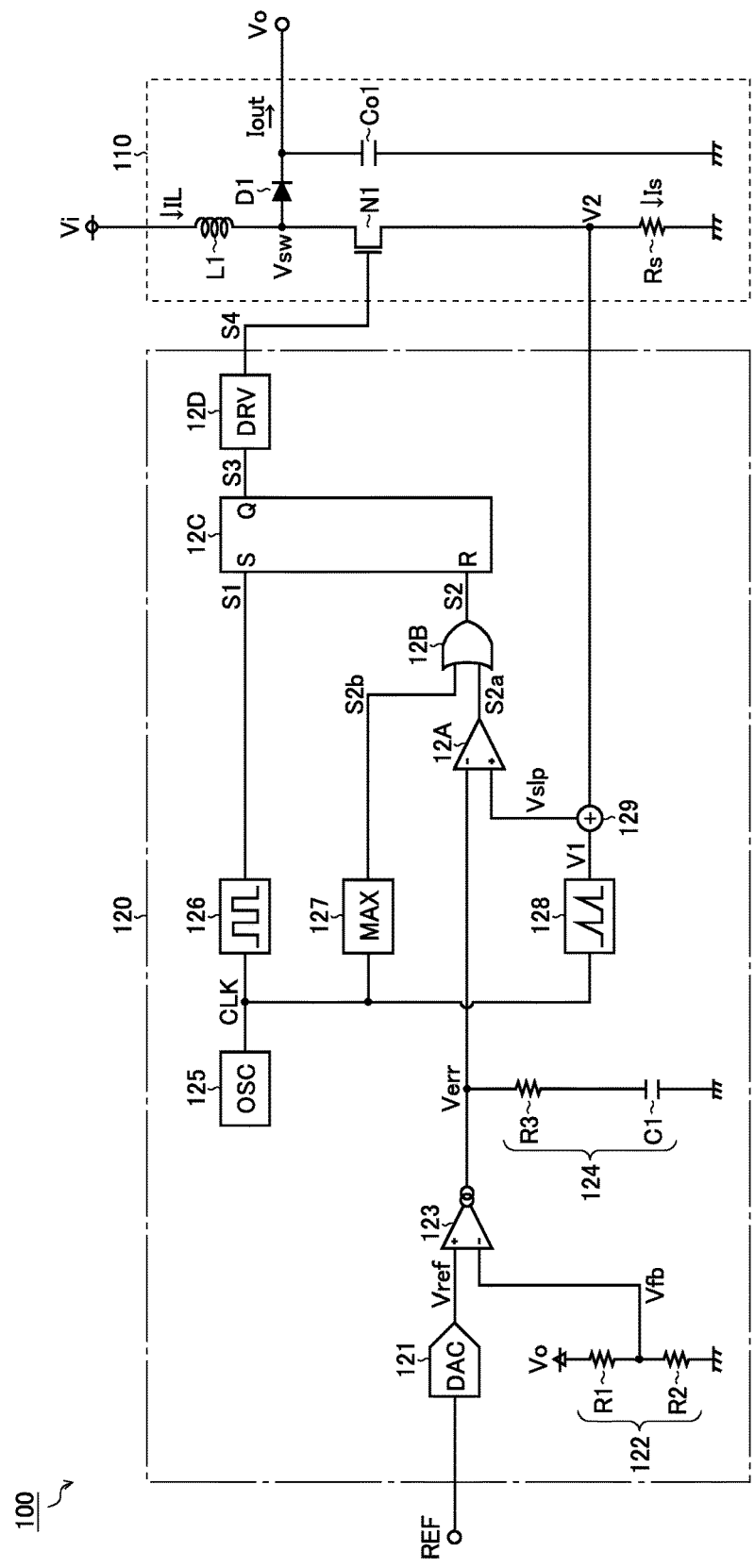
FIG. 2 is a circuit diagram, showing a first embodiment of a switching power supply circuit.

Switching Power Supply Circuit (First Embodiment): FIG. 2 is a circuit diagram showing a first embodiment of the switching power supply, circuit incorporated in the system power supply 11. The switching power supply circuit 100 of this embodiment is a circuit that generates a desired output voltage Vo (for example, corresponding to the analog system supply voltage AVDD) from an input voltage Vi (for example, corresponding to the input voltage VIN), and includes, a switching output stage 110 and a switching controller 120.

The switching output stage 110 is a step-up switching output stage that generates the output voltage Vo by stepping up the input voltage Vi by driving a coil current IL by turning ON and OFF an output transistor N1, and includes an output transistor N1 (in the illustrated example, an N-channel MOS (metal-oxide-semiconductor) field-effect transistor), a coil L1, a rectification diode D1, an output capacitor Co1, and a sense resistor Rs.

The first terminal of the coil L1 is connected to the input terminal of the input voltage V1. The second terminal of the coil L1 is connected to the drain of the output transistor N1 and to the anode of the rectification diode D1. The source of the output transistor N1 is connected to the first terminal of the sense resistor Rs. The second terminal of the sense resistor Rs is connected to the ground terminal. The sense resistor Rs serves as a current-voltage conversion element for deriving a sense voltage V2 ($=Is \times Rs$) from a switching current Is that passes through the sense resistor Rs (the current corresponding to the coil current IL that passes during the ON period of the output transistor N1). The gate of the output transistor N1 is connected to the output terminal of the switching controller 120 (that is, the output terminal of a gate signal S4). The cathode of the rectification diode D1 is connected to the output terminal of the output voltage Vo and to the first terminal of the output capacitor Co1. The second terminal of the output capacitor Co1 is connected to the ground terminal.

The switching output stage 110 may adopt, instead of diode rectification, synchronous rectification. In that case, the rectification diode D1 is replaced with a synchronization rectification transistor, and this and the output transistor N1 can be turned ON and OFF complementarily.

The switching controller 120 is an output feedback circuit that turns the output transistor N1 ON and OFF so as to keep a feedback voltage Vfb, which is commensurate with the output voltage Vo, equal to a predetermined reference voltage Vref, and includes a digital-analog converter 121, a feedback voltage generator 122, an error amplifier 123, a phase compensator 124, a clock signal generator 125, a set signal generator 126, a maximum duty setter 127, a reference slope voltage generator 128, a voltage adder 129, a comparator 12A, an OR gate 12B, an RS flip-flop 12C, and a driver 12D.

The digital-analog converter 121 generates an analog reference voltage Vref from a digital reference voltage setting signal REF.

The feedback voltage generator 122 includes resistors R1 and R2 connected in series between the output terminal of the output voltage Vo and the ground terminal, and outputs, from the connection node between the resistors R1 and R2, a feedback voltage Vfb (=[R2/(R1+R2)]×Vo), which is a division voltage of the output voltage Vo. In a case where the output voltage Vo falls within the input dynamic range of the switching controller 120 in particular, the error amplifier 123), the feedback voltage generator 122 may be omitted, in which case the output voltage Vo itself can be accepted as the feedback voltage Vfb.

The error amplifier 123 is a current-output transconductance amplifier (so-called gm amplifier). The error amplifier 123 generates an error voltage Verr by charging and discharging a capacitor C1 provided in the phase compensator 124 according to the difference between the feedback voltage Vfb, which is fed to the inverting input terminal (−) of the error amplifier 123, and the reference voltage Vref which is fed to the non-inverting input terminal (+) of the error amplifier 123. When the feedback voltage Vfb is lower than the reference voltage Vref, a current passes from the error amplifier 123 into the capacitor C1, and thus the error voltage Verr rises. Reversely, when the feedback voltage Vfb is higher than the reference voltage Vref, a current passes out of the capacitor C1 to the error amplifier 123, and thus the error voltage Verr falls.

The phase compensator 124 is a time constant circuit that includes a resistor R3 and a capacitor C1 connected in series between the output terminal of the error amplifier 123 and the ground terminal, and compensates the phase of the error voltage Verr.

The clock signal generator 125 generates a clock signal CLK at a predetermined reference frequency f0(=1/T0).

The set signal generator 126 generates Pulses in a set signal S1 in synchronism with the clock signal CLK. For example, the set signal generator 126 generates a pulse in the set signal S1 every m pulses in the clock signal CLK. Accordingly, the pulse period T of the set signal S1 (that is, the switching period T of the output transistor N1) equals m×T0.

The maximum duty setter 127 generates pulses in a maximum duty setting signal S2b in synchronism with the clock signal CLK. For example, the maximum duty setter 127 generates a pulse in the maximum duty setting signal S2b every n-th pulse (where n<m) in the clock signal CLK as counted from when a pulse is generated in the set signal S1. That is, the maximum duty setter 127 generates a pulse in the maximum duty setting signal S2b at the lapse of a maximum ON period Ton(max)(=n×T0) since the generation of a pulse in the set signal S1.

The reference slope voltage generator 128 generates a reference slope voltage V1 in synchronism with the clock signal CLK. The reference slope voltage V1 is, for example, an analog voltage with a saw tooth waveform that starts to rise when a pulse is generated in the set signal S1 (that is, at the first pulse in the clock signal CLK) and that is reset to a zero value when a pulse is generated in the maximum duty setting signal S2b (that is, at the n-th pulse in the clock signal CLK). However, this is not meant to limit the configuration of the reference slope voltage generator 128; it may instead be configured so as to generate the reference slope voltage V1 in synchronism with both the set signal S1 and a pulse width modulation signal S3.

The voltage adder 129 generates a slope voltage Vslp by adding up the reference slope voltage V1 and the sense voltage V2. In this way, the reference slope voltage V1 and the sense voltage V2 are added up to generate the slope voltage Vslp, and based on this, the ON duty of the output transistor N1 is determined; it is thus possible to achieve current mode control in accordance with both the output voltage Vo and the coil current IL.

The comparator 12A generates a comparison signal S2a by comparing the error voltage Verr, which is fed to the inverting input terminal (−) of the comparator 12A, with the slope voltage Vslp, which is fed to the non-inverting input terminal (+) of the comparator 12A. The comparison signal S2a is at LOW level when the error voltage Verr is higher than the slope voltage Vslp, and is at HIGH level when the error voltage Verr is lower than the slope voltage Vslp.

The OR gate 12B outputs as a reset signal S2 the logical addition (OR) signal between the comparison signal S2a and the maximum duty setting signal S2b. Accordingly, the reset signal S2 is at HIGH level when at least one of the comparison signal S2a and the maximum duty setting signal S2b is at HIGH level, and is at LOW level when the comparison signal S2a and the maximum duty setting signal S2b are both at LOW level.

The RS flip-flop 12C outputs, from its output terminal (Q), a pulse width modulation signal S3 according to the set signal S1, which is fed to the set terminal (S) of the RS flip-flop 12C, and the reset signal S2, which is fed to the reset terminal (R) of the R5 flip-flop 12C. For example, the pulse width modulation signal S3 is set to HIGH level at a rising edge in the set signal S1, and is reset to LOW level at, a rising edge in the reset signal S2.

The driver 12D receives the pulse width modulation signal S3, augments its current capacity to thereby generate a gate signal S4 for the output transistor N1 (the signal corresponding to a control signal for turning the output transistor N1 ON and OFF), and outputs the gate signal S4 to the gate of the output transistor N1. The output transistor N1 is ON when the gate signal S4 is at HIGH level, and is OFF when the gate signal S4 is at LOW level.

Basic Operation (Step-Up Operation): First, the basic operation (step-up operation) of the switching power supply circuit 100 will be described. When the output transistor N1 is turned ON, a coil current IL (that is, a switching current Is) passes through the coil L1 via the output transistor N1 to the ground terminal, resulting in electrical energy being stored. At this time, the switching voltage Vsw that appears at the anode of the rectification diode D1 falls, via the output transistor N1, to approximately the ground voltage, and thus no current passes from the output capacitor Co1 to the output transistor N1.

On the other hand, when the output transistor N1 is turned OFF, by a back electromotive force that occurs in the coil L1, the electrical energy stored there is discharged as a current. At this time, the rectification diode D1 is forward-biased; thus, the coil current IL that passes through the rectification diode D1 passes, as an output current Iout, from the output terminal of the output voltage Vo into a load (such as the source driver 15 and the gamma voltage generator 16), and also passes via the output capacitor Co1 to the ground terminal, thereby charging the output capacitor Co1. As the operation described above is repeated, the input voltage Vi is stepped up and the resulting output voltage Vo is fed to the load.

Figure 3:
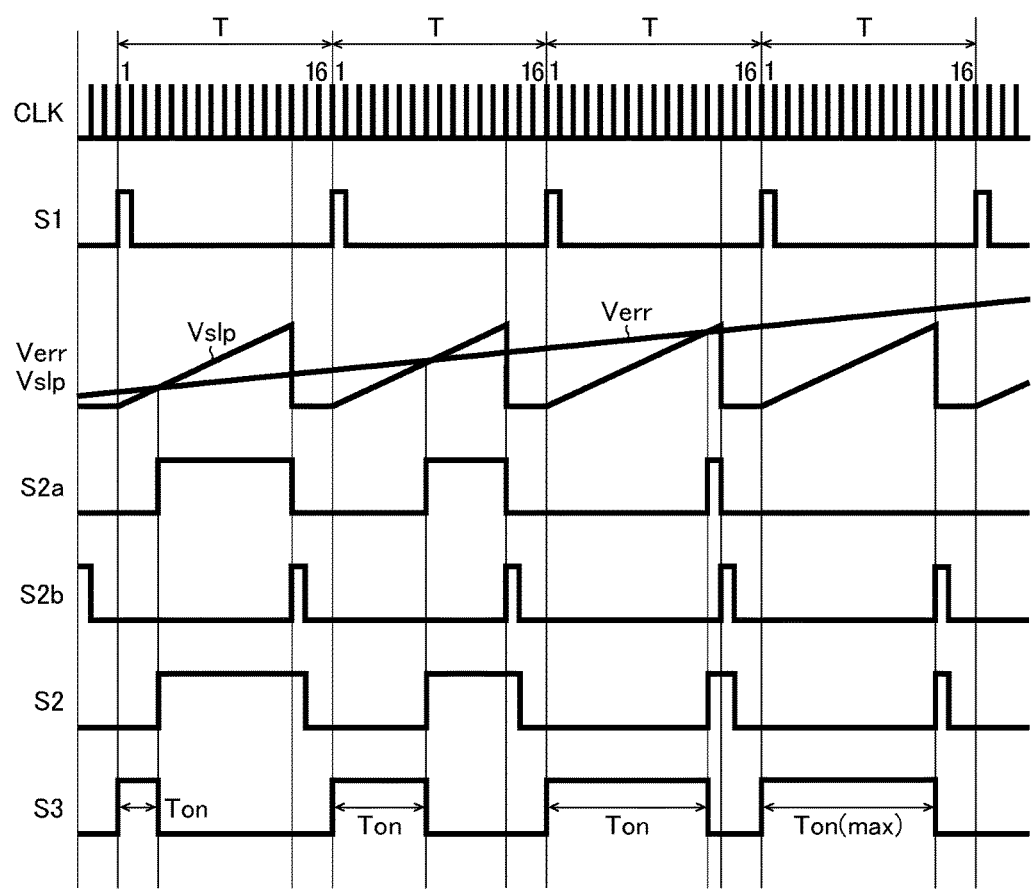
FIG. 3 is a timing chart showing one example of duty control.

Duty Control: FIG. 3 is a timing chart showing one example of duty control in accordance with the error voltage Verr, depicting, from top down, the clock signal CLK, the set signal S1, the error voltage Verr and the slope voltage Vslp, the comparison signal S2a, the maximum duty setting signal S2b, the reset signal S2, and the pulse width modulation signal S3.

In the illustrated example, every sixteen pulses in the clock signal CLK, a pulse in the set signal S1 is generated. When the set signal S1 rises to HIGH level, the pulse width modulation signal S3 is set to HIGH level, and thus the output transistor N1 turns ON. At this time, the slope voltage Vslp starts to rise with a predetermined gradient.

Thereafter, when the slope voltage Vslp becomes higher than the error voltage Verr, the comparison signal S2a rises to HIGH level, and hence the reset signal S2 rises to HIGH level. As a result, the pulse width modulation signal S3 is reset to LOW level, and thus the output transistor N1 turns OFF.

Here, the higher the error voltage Verr, the later the time that it crosses the slope voltage Vslp. This results in a longer HIGH-level period of the pulse width modulation signal S3 (that is, a longer ON period Ton of the output transistor N1) and hence a higher ON duty Don of the output transistor N1 (that is, a higher proportion of the ON period in the switching period T; Don=Ton/T).

Reversely, the lower the error voltage Verr, the earlier the time that it crosses the slope voltage Vslp. This results in a shorter HIGH-level period of the pulse width modulation signal S3 and hence a lower ON duty Don of the output transistor N1.

As described above, in the switching power supply circuit 100, by determining the ON duty Don of the output transistor N1 according to the result of comparison between the error voltage Verr and the slope voltage Vslp, the desired output voltage Vo is generated from the input voltage Vi.

However, if, as a result of the error voltage Verr becoming too high, a pulse in the maximum duty setting signal S2b is generated before the comparison signal S2a rises to HIGH level, at this time point the reset signal S2 rises to HIGH level and the output transistor N1 turns OFF. That is, the ON period Ton of the output transistor N1 is subject to a predetermined upper limit value (that is, the maximum ON period Ton(max)).

Figure 4:
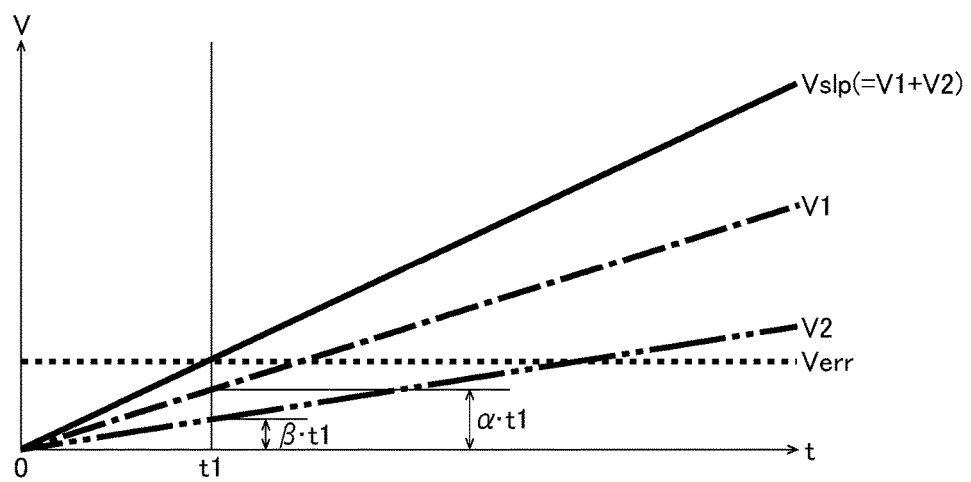
FIG. 4 is a waveform diagram showing a first example (light load) of slope generating operation in the first embodiment.

Slope Generating Operation: FIG. 4 is a waveform diagram showing a first example (in a light-load or no-load condition; for example, Iout=0 A) of slope generating operation in the first embodiment. In the diagram, the horizontal axis represents the lapse of time t since the turning ON of the output transistor N1, and the vertical axis represents the voltage of the reference slope voltage V1 (dash-and-diet line), the Sense voltage V2 (dash-and-double-dot line), the slope voltage Vslp (solid line), and the error voltage Verr (broken line).

Starting when the output transistor N1 turns ON (t=0), the reference slope voltage V1 increases with a predetermined gradient α [V/t]. Accordingly, the voltage value of the reference slope voltage V1 at time point t1 (that is, when the slope voltage Vslp and the error voltage Verr cross each other) is given by V1=α×t1.

On the other hand, starting when the output transistor N1 turns ON (t=0), the sense voltage V2 increases with a gradient β [V/t] commensurate with the switching current Is. In a no-load condition, the switching current Is increases gradually from 0 A, and accordingly the sense voltage V2 increases from 0 V. That is, in a no-load condition, the DC component (=V2DC) of the sense, voltage V2 equals 0 V Accordingly, the voltage value of the sense voltage V2 at time point t given by V2=β×t1.

As mentioned previously, the slope voltage Vslp is generated by adding up the reference slope voltage V1 and the sense voltage V2. Accordingly, the voltage value of the slope voltage Vslp at time point t1 is given by Vslp=V1+V2=(α+β)×t1.

Figure 5:
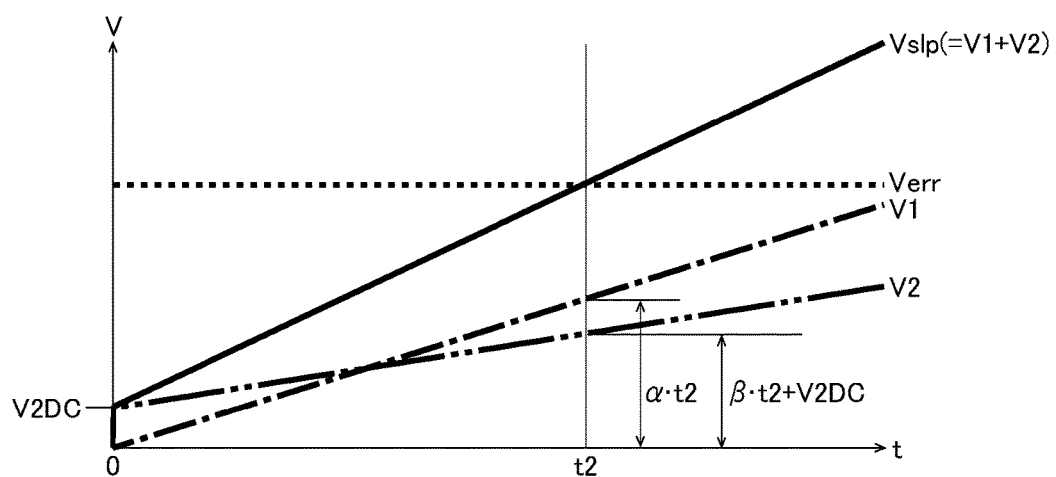
FIG. 5 is a waveform diagram showing a second example (heavy load) of slope generating operation in the first embodiment.

FIG. 5 is a waveform diagram showing a second example (in a heavy-load condition; for example, Iout=1 A) of slope generating operation in the first embodiment. As in FIG. 4 referred to previously, in FIG. 5, the horizontal axis represents the lapse of time t since the turning ON of the output transistor N1, and the vertical axis represents the voltage of the reference slope voltage V1 (dash-and-dot line), the sense voltage V2 (dash-and-double-dot line), the slope voltage Vslp (solid line), and the error voltage Verr (broken line).

As mentioned previously, starting when the output transistor N1 turns ON (t=0), the reference slope voltage V1 increases with a predetermined gradient α [V/t]. Accordingly, the voltage value of the reference slope voltage V1 at time point t2 (that is, when the slope voltage Vslp and the error voltage Verr cross each other, and here t1<t2) is given by V1=α×t2.

On the other hand, starting when the output transistor N1 turns ON (t=0), the sense voltage V2 increases with a gradient β [V/t] commensurate with the switching current Is. In a heavy-load condition, at the same time that the output transistor N1 turns ON, the switching current Is increases rapidly up to the current value commensurate with the output current Iout and then further increases gradually as time passes. Thus, the sense voltage V2 comes to have a DC component (=V2DC) commensurate with the output current Iout. Accordingly, the voltage value of the sense voltage V2 at time point t2 is given by V2=β×t2+V2DC.

As mentioned previously, the slope voltage Vslp is generated by adding up the reference slope voltage V1 and the sense voltage V2. Accordingly, the voltage value of the slope voltage Vslp at time point t2 is given by Vslp=V1+V2=(α+β)×t2+V2DC.

In this way, the reference slope voltage V1 and the sense voltage V2 are added up to generate the slope voltage Vslp, and based on this, the ON duty of the output transistor N1 is determined; it is thus possible to achieve current mode control in accordance with both the output voltage Vo and the coil current IL.

However, the slope voltage Vslp includes not only the DC component (=V2DC) of the sense voltage V2 that is commensurate with the heaviness of the load (that is, the magnitude of the output current Iout) but also an AC component (=β×t) of the sense voltage V2 that depends on the elapsed time t.

Thus, a change in the ON duty Don of the output transistor N1 resulting from a variation in the load causes, when the error voltage Verr and the slope voltage Vslp cross each other, a change in the AC component (=β×t) of the sense voltage V2 that is contained in the slope voltage Vslp. For example, as shown in FIGS. 4 and 5, between the AC component of the sense voltage V2 at time point t1 (=β×t1) and the AC component of the sense voltage V2 at time point t2 (=β×t2), the elapsed time t produces an unintended voltage difference (=β×(t2−t1)).

Also, a variation in the gradient β itself resulting from a variation in the load causes a change in the AC component (=β×t) of the sense voltage V2.

Figure 6:
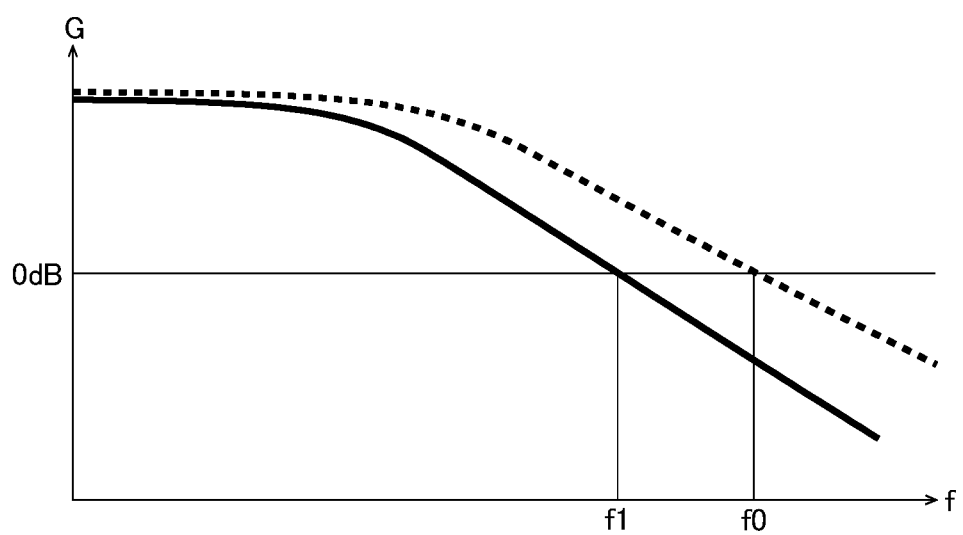
FIG. 6 is a gain curve diagram showing a frequency-PWM gain response in the first embodiment.

FIG. 6 is a gain curve diagram showing the frequency-PWM gain response in the first embodiment. The broken line deals with a light-load condition (for example, Iout=0 A), and the solid line deals with a heavy-load condition (for example, Iout=1 A).

As mentioned previously, in the switching power supply circuit 100 of the first embodiment, the slope voltage Vslp contains the AC component (=β×t) of the sense voltage V2; thus, as the load varies, the slope compensation ratio and the PWM gain vary. As a result, the current feedback ratio also varies, and this reduces the phase margin in a light-load condition (see the change from f1 to f0). Moreover, as the load varies, the load response varies.

In particular, in the source driver 15 and the gamma voltage generator 16 as the load of the switching power supply circuit 100, their current consumption varies periodically as the liquid crystal display panel 20 repeats display periods and non-display periods (so-called blanking periods) alternately.

That is, the output current Iout of the switching power supply circuit 100 varies periodically according to how the liquid crystal display panel 20 is being driven. Specifically, in the display period of the liquid crystal display panel 20, a predetermined output current Iout passes (a heavy-load condition). In contrast, in the non-display period of the liquid crystal display panel 20, almost no output current Iout passes (a light-load condition).

As described above, in the switching power supply circuit 100 in which light-load and heavy-load conditions switch frequently, to stabilize its output operation, and to obtain a desired load response, it is preferable that the slope compensation ratio and the PWM gain be kept constant against variation of the load. To achieve that, a second embodiment will be proposed below.

Figure 7:
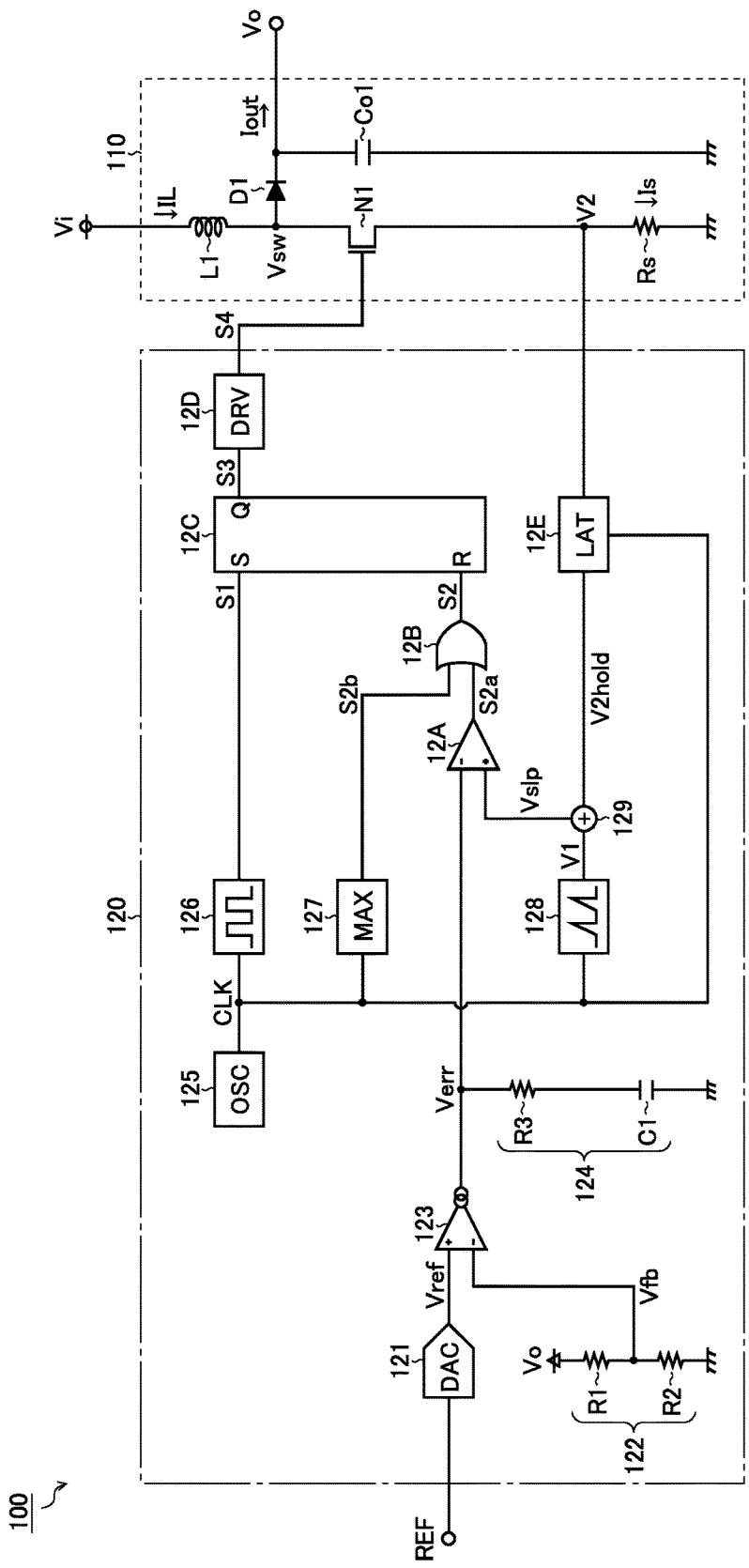
FIG. 7 is a circuit diagram showing a second embodiment of a switching power supply circuit.

Switching Power Supply Circuit (Second Embodiment): FIG. 7 is a circuit diagram showing a second embodiment of the switching power supply circuit 100. The switching power supply circuit 100 of this embodiment is based on the first embodiment (FIG. 2), and is characterized by additionally including a sense voltage holder 12E. Accordingly, such components as find their counterparts in the first embodiment will be identified by the same reference signs as in FIG. 2, and no overlapping description will be repeated. The following description thus focuses on features unique to the second embodiment.

The sense voltage holder 12E latches the sense voltage V2 with predetermined timing to thereby generate a held sense voltage V2hold, and outputs it to the voltage adder 129, The sense voltage holder 12E operates in synchronism with the clock signal CLK.

To cope with the addition of the sense voltage holder 12E, the configuration of the voltage adder 129 is so changed as to generate the slope voltage Vslp by adding up the reference slope voltage V1 and the held sense voltage V2hold.

Figure 8:
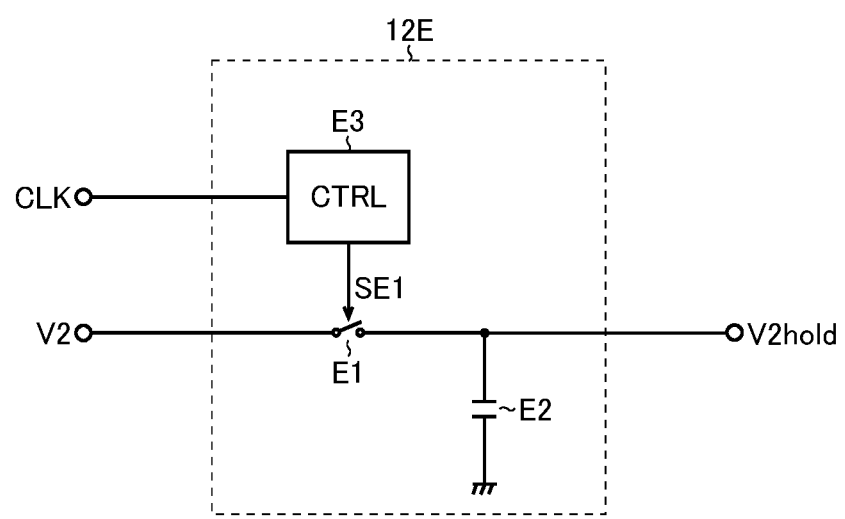
FIG. 8 is a circuit diagram showing one configuration example of a sense voltage holder.

Sense Voltage Holder: FIG. 8 is a circuit diagram showing one configuration example of the sense voltage holder 12E. The sense voltage holder 12E of this configuration example includes a switch E1, a capacitor E2, and a controller E3. The first terminal of the switch E1 is connected to the input terminal of the sense voltage V2. The second terminal of the switch E1 and the first terminal of the capacitor E2 are both connected to the output terminal of the held sense voltage V2hold. The second terminal of the capacitor E2 is connected to the ground terminal. The control terminal of the switch E1 is connected to the application terminal of a switch control signal SE1 (that is, the signal output terminal of the controller E3).

The controller E3 turns the switch E1 ON and OFF by switching the logic level of the switch control signal SE1 in synchronism with the clock signal CLK. For example, the switch E1 is ON when the switch control signal SE1 is at HIGH level, and is OFF when the switch control signal SE1 is at LOW level.

That is, when the switch control signal SE1 is at HIGH level, the path between the input terminal of the sense voltage V2 and the first terminal of the capacitor E2 conducts. Accordingly, the capacitor E2 is charged until the voltage across it becomes approximately equal to the sense voltage V2.

On the other hand, when the switch control signal SE1 is at LOW level, the path between the input terminal of the sense voltage V2 and the first terminal of the capacitor E2 is cut off. Accordingly, the held sense voltage V2hold is held equal to the voltage (≈V2) across the capacitor E2 immediately before the turning OFF of the switch E1.

As described above, the sense voltage holder 12E latches the sense voltage V2 with predetermined timing through so-called track-and-hold operation.

Figure 9:
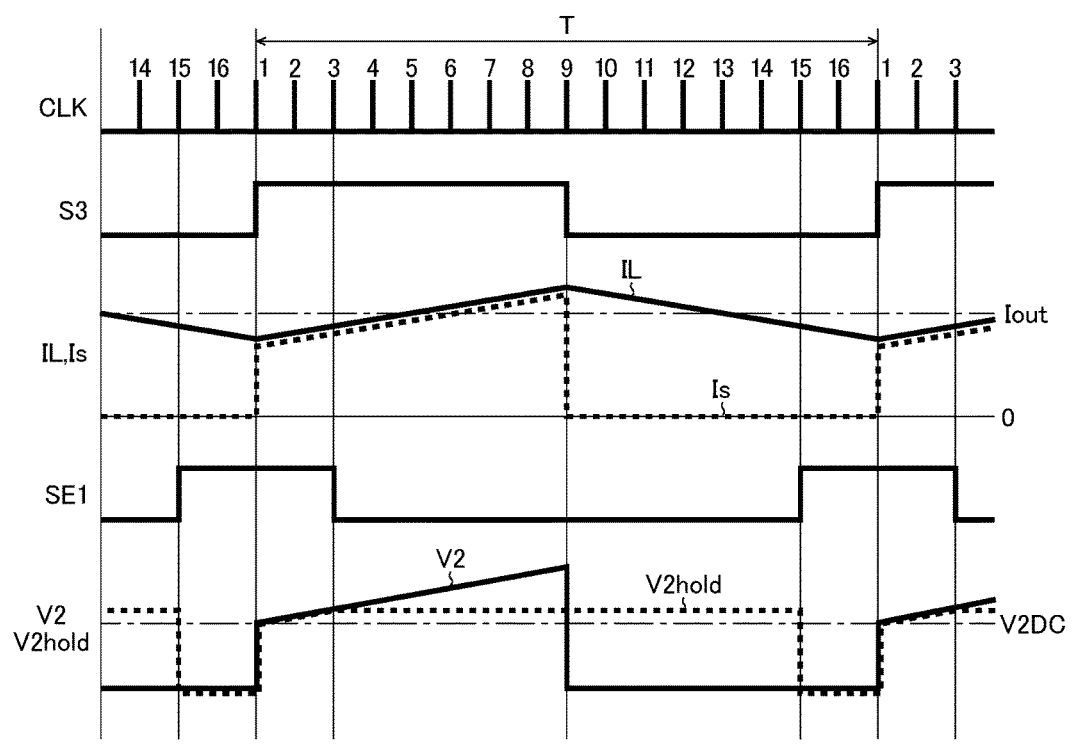
FIG. 9 is a timing chart showing one example of sense voltage holding operation.

FIG. 9 is a timing chart showing one example of sense voltage holding operation, depicting, from top down, the clock signal CLK, the pulse width modulation signal S3, the coil current IL (solid line) and the switching current Is (broken line), the switch control signal SE1, and the sense voltage V2 (solid line) and the held sense voltage V2hold (broken line). In this diagram, the switching period T of the switching power supply circuit 100 corresponds to sixteen pulses in the clock signal CLK.

When the pulse width modulation signal S3 turns from LOW level to HIGH level the output transistor N1 turns from OFF to ON; thus, the coil current IL, which has thus far been decreasing, starts to increase. The switching current Is corresponds to the coil current IL that passes during the ON period of the output transistor N1. Accordingly, at the same time that the output transistor N1 turns ON, the sense voltage V2 rises sharply up to the voltage value (=V2DC) commensurate with the minimum value of the coil current IL, and thereafter further increases as time passes.

The switch control signal SE1 has its logic level switched in synchronism with the clock signal CLK. Specifically, in the illustrated example in particular, the switch control signal SE1 rises to HIGH level at the fifteenth pulse in the clock signal CLK, and falls to LOW level at the third pulse in the clock signal CLK. As a result, the held sense voltage V2hold starts to follow the sense voltage V2 a while before the turning ON of the output transistor N1, and then, after the turning ON of the output transistor N1, when the switch control signal SE1 falls, the held sense voltage V2hold latches the sense voltage V2.

In the illustrated example, the operation for detecting the coil current IL (that is, the operation for latching the sense voltage V2) is performed during the ON period of the output transistor N1. It is preferable that the timing with which the sense voltage V2 is latched (the timing with which the switch control signal SE1 falls) be set to be, with consideration given to the minimum ON duty Ton(min) of the output transistor N1, such timing ensures that the output transistor N1 is ON.

However, the operation for detecting the coil current IL does not necessarily have to be performed during the ON period of the output transistor N1. Specifically, in a case where the coil current IL that passes during the OFF period of the output transistor N1 is the target of detection, instead of the operation for latching the sense voltage V2, for example, an operation for latching the switching voltage Vsw during the OFF period of the output transistor N1 may be performed. In that case, it is preferable that the timing with which the switching voltage Vsw is latched be set to be, with consideration given to the maximum ON duty Ton (max) of the output transistor N1, such timing as ensures that the output transistor N1 is OFF.

As described above, the timing with which the coil current IL is detected can be set freely so long as it remains from one period to the next. In a case where the switching output stage 110 is of a step-up type, it is preferable to adopt a configuration where the coil current IL is detected during the ON period of the output transistor N1, that is, a configuration where the switching current Is passing through the output transistor N1 is taken as the target for detection.

Figure 10:
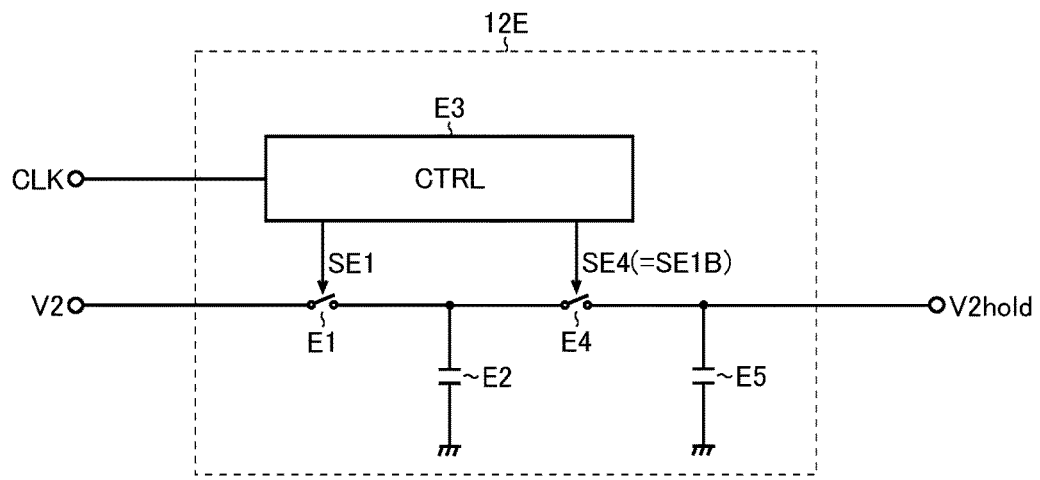
FIG. 10 is a circuit diagram showing one modified example of a sense voltage holder.

FIG. 10 is a circuit diagram showing one modified example of the sense voltage holder 12E. The sense voltage holder 12E of this modified example is based on the configuration in FIG. 8, and is characterized by further including a switch E4 and a capacitor E5.

The first terminal of the switch E1 is connected to the input terminal of the sense voltage V2. The second terminal, of the switch E1 and the first terminal of the capacitor E2 are both connected to the first terminal of the switch E4. The second terminal of the capacitor E2 is connected to the ground terminal. The second terminal of the switch E4 and the first terminal of the capacitor E5 are both connected to the output terminal of the held sense voltage V2hold. The second terminal of the capacitor E5 is connected to the ground terminal. The control terminals of the switches E1 and E4 are connected respectively to the application terminals of switch control signals SE1 and SE4 (that is, the signal output terminals of the controller E3). As the switch control signal SE4, for example, the logic inverse signal (=SE1B) of the switch control signal SE1 can be used.

The controller E3 turns the switches E1 and E4 complementarily by switching the logic levels of the switch control signals SE1 and SE4 individually in synchronism with the clock signal CLK.

For example, when the switch control signal SE1 is at HIGH level and the switch control signal SE4 is at LOW level, the switch E1 is ON and the switch E4 is OFF. That is, the path between the input terminal of the sense voltage V2 and the first terminal of the capacitor E2 conducts, and the path between the first terminal of the capacitor E2 and the output terminal of the sense voltage V2 is cut off. Accordingly, the capacitor E2 is charged until the voltage across it becomes approximately equal to the sense voltage V2. The held sense voltage V2hold is held equal to the voltage across the capacitor E5 immediately before the turning OFF of the switch E4.

On the other hand, when the switch control signal SE1 is at LOW level and the switch control signal SE4 is at HIGH level, the switch E1 is OFF and the switch E4 is ON. That is, the path between the input terminal of the sense voltage V2 and the first terminal of the capacitor E2 is cut off, and the path between the first terminal of the capacitor E2 and the output terminal of the held sense voltage V2hold conducts. At this time, between the capacitors E2 and E5, electric charge is re-distributed until the voltages across them become equal. Accordingly, in a case where the capacitors E2 and E5 have the same capacitance value, the held sense voltage V2hold equals the average value of the voltage across the capacitor E2 immediately before the turning ON of the switch E4 (corresponding to the sampled value in the current period) and the voltage across the capacitor E5 (corresponding to the held value in the previous period).

As described above, as the sense voltage holder 12E, instead of a track-and-hold circuit (FIG. 8), a sample-and-hold circuit (FIG. 10) may be used.

Figure 11:
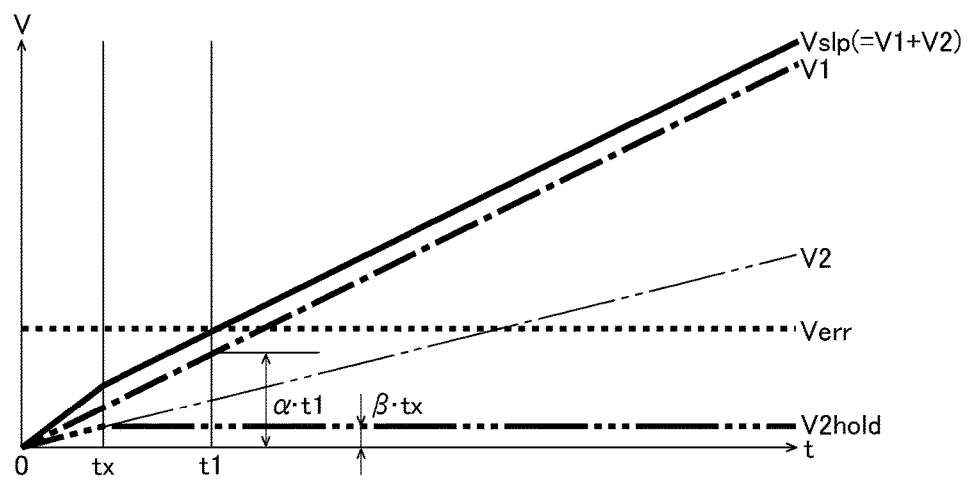
FIG. 11 is a waveform diagram showing a first example (light load) of slope generating operation in a second embodiment.

Slope Generating Operation: FIG. 11 is a waveform diagram showing a first example (in a light-load or no-load condition; for example, Iout=0) of slope generating operation in the second embodiment. In the diagram, the horizontal axis represents the lapse of time t since the turning ON of the output transistor N1, and the vertical axis represents the voltage of the reference slope voltage V1 (dash-and-dot line), the sense voltage V2 (dash-and-double-dot line), the held sense voltage V2hold (dash-and-triple-dot line), the slope voltage Vslp (solid line), and the error voltage Veer (broken line).

The reference slope voltage V1 and the sense voltage V2 behave in the same manner as in FIG. 4 referred to previously, and therefore no overlapping description will be repeated. Starting when the output transistor N1 turns ON (t=0), the held sense voltage V2hold follows the sense voltage V2 to increase with a gradient β [V/t] its voltage value is then latched with predetermined latch timing (at time point tx) that is set to be earlier than time point t1. Accordingly, starting at time point tx, the voltage value of the held sense voltage V2hold is held at V2hold=β×tx irrespective of the elapsed time t.

As mentioned previously, the slope voltage Vslp is generated by adding up the reference slope voltage V1 and the held sense voltage V2hold. Thus, the voltage value of the slope voltage Vslp at time point t1 is given by Vslp=V1+V2hold=αt1+β×tx.

Figure 12:
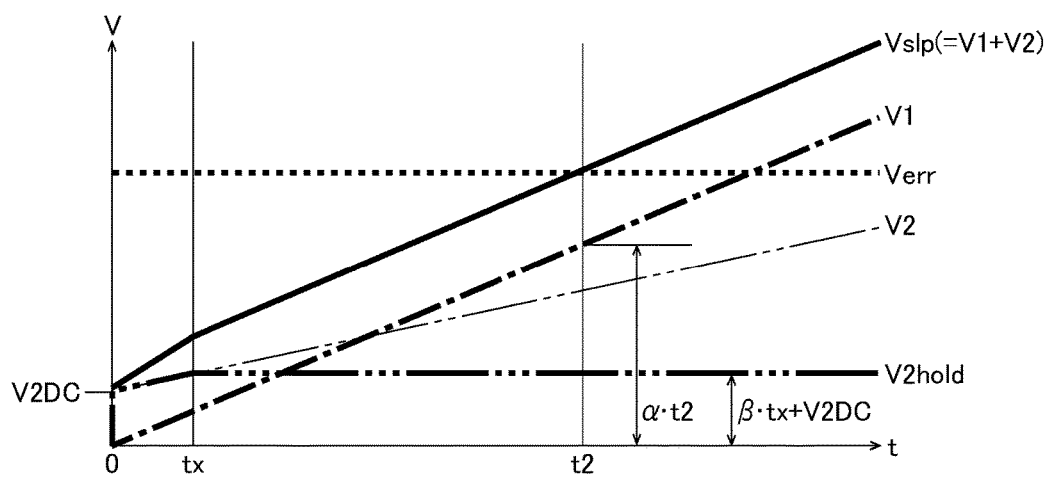
FIG. 12 is a waveform diagram showing a second example (heavy load) of slope generating operation in the second embodiment.

FIG. 12 is a waveform diagram showing a second example (in a heavy-load condition; for example, Iout=1 A) of slope generating operation in the second embodiment. As in FIG. 11 referred to previously, in FIG. 12, the horizontal axis represents the lapse of time t since the turning ON of the output transistor N1, and the vertical axis represents the voltage of the reference slope voltage V1 (dash-and-dot line), the sense voltage V2 (dash-and-double-dot line), the held sense voltage V2hold (dash-and-triple-dot line), the slope voltage Vslp (solid line), and the error voltage Verr (broken line).

The reference slope voltage V1 and the sense voltage V2 behave in the same manner as in FIG. 5 referred to previously, and therefore no overlapping description will be repeated. Starting when the output transistor N1 turns ON (t=0), the held sense voltage V2hold follows the sense voltage V2 to increase with a gradient β [V/t] its voltage value is then latched with predetermined latch timing (at time point tx) that is set to be earlier than time point t2. In a heavy-load condition, at the same time that the output transistor N1 turns ON, the switching current Is increases rapidly up to the current value commensurate with the output current Iout, and thereafter further increases gradually as time passes. Thus, the held sense voltage V2hold comes to have a DC component (=V2DC) commensurate with the output current Iout. Accordingly, starting at time point tx, the voltage value of the held sense voltage V2hold is held at V2hold=β×tx×V2DC irrespective of the elapsed time t.

As mentioned previously, the slope voltage Vslp is generated by adding up the reference slope voltage V1 and the held sense voltage V2hold. Thus, the voltage value of the slope voltage Vslp at time point t2 is given by Vslp=V1×V2hold=α×t2+β×tx+V2DC.

In this way, the reference slope voltage V and the held sense voltage V2hold are added up to, generate the slope voltage Vslp, and based on this, the ON duty of the output transistor N1 is determined; it is thus possible to achieve current mode control in accordance with both the output voltage Vo, and the coil current IL. This benefit is basically the same as that obtained in the first embodiment described previously.

Moreover, the voltage value of the held sense voltage V2hold remains constant starting with the predetermined latch timing (at time point tx). Thus, the slope voltage Vslp apt the second embodiment is less affected by the AC component (=β×t) of the sense voltage V2 than that in the first embodiment, and thus more properly reflects the DC component (=V2DC) of the sense voltage V2.

That is, even when the elapsed time t produces a voltage difference (=β×(t2−t1)) between the AC component of the sense voltage V2 at time point t1 (=β×t1) and the AC component of the sense voltage V2 at time point t2 (=β×t2), it has no effect whatever on duty control using the slope voltage Vslp.

Also, even when the gradient β itself varies as the load varies, so long as time point tx is constant, the variation does not affect duty control using the slope voltage Vslp.

Figure 13:
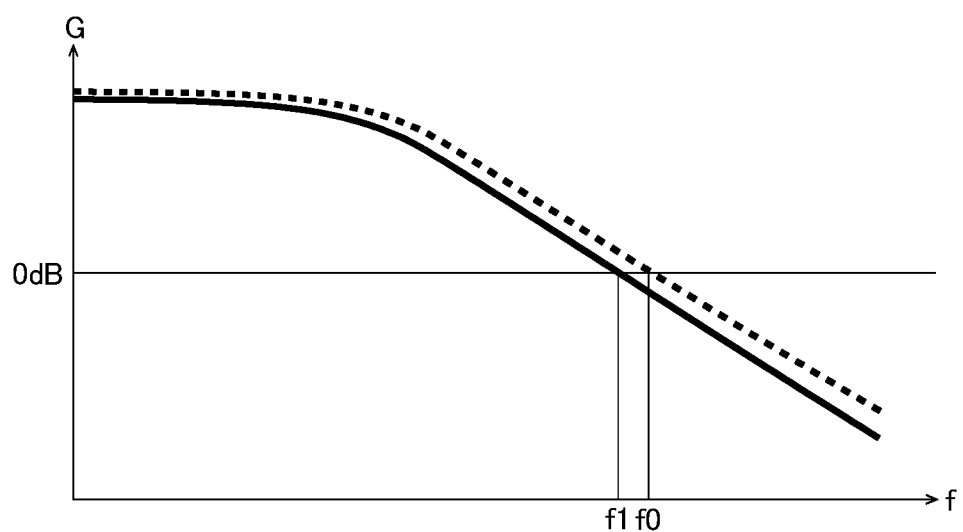
FIG. 13 is a gain curve diagram showing; a frequency-PWM gain response in the second embodiment.

FIG. 13 is a gain curse diagram showing the frequency-PWM gain response in the second embodiment. The broken line deals with a light-load condition (for example, Iout=0 A), and the solid line deals with a heavy-load condition (for example, Iout=1 A).

As mentioned previously, the slope voltage Vslp the second embodiment is less prone to be affected by the AC component (=β×t) of the sense voltage V2, and thus even when the load varies, the slope compensation ratio and the PWM gain are less prone to vary. Thus, the current feedback ratio is less prone to change, and hence the phase margin can be maintained in a light-load condition. The load response can also be kept constant against variation of the load.

In particular, in the switching power supply circuit 100 in which light-load and heavy load conditions switch frequently, to stabilize its output operation, and to obtain a desired load response, it is preferable to adopt the second embodiment described above to keep the slope compensation ratio and the PWM gain constant against variation of the load.

Figure 14:
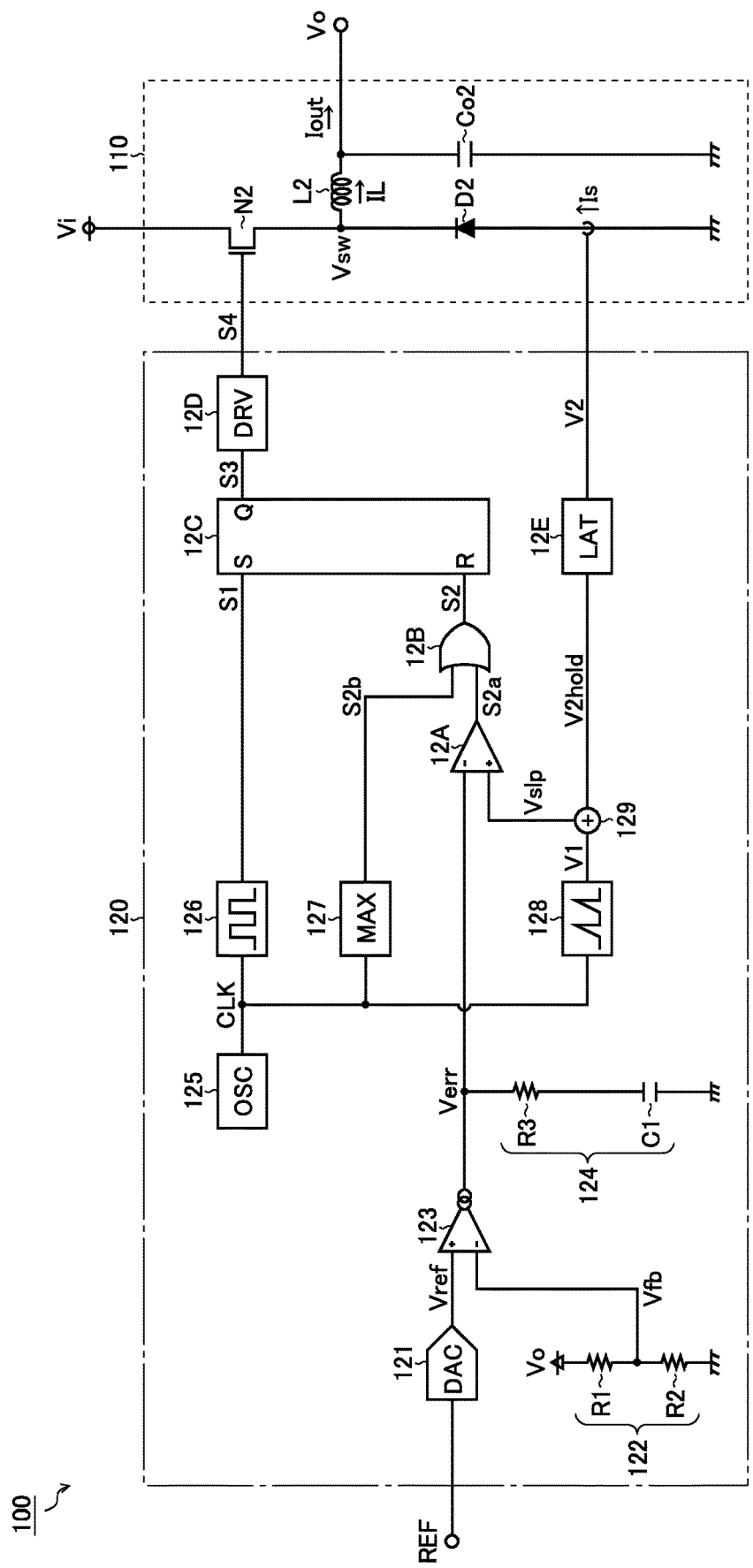
FIG. 14 is a circuit diagram showing a third embodiment of a switching, power supply circuit.

Switching Power Supply Circuit (Third Embodiment): FIG. 14 is a circuit diagram showing a third embodiment of the switching power supply circuit 100. This embodiment is based on the second embodiment (FIG. 7) described previously, and is characterized in that the output type of the switching output stage 110 is modified to a step-down type. Accordingly, such components as find their counterparts in the second embodiment will be identified by the same reference signs as in FIG. 7, and no overlapping description will be repeated. The following description thus focuses on features unique to the third embodiment.

The switching output stage 110 is a step-down switching output stage that generates a desired output voltage Vo (for example, corresponding to the logic system supply voltage VDD) by stepping down an input voltage Vi (for example, corresponding to the input voltage V1N) by driving a coil current IL by use of an output transistor N2, and includes an output transistor N2 in the illustrated example, an N-channel MOS field-effect transistor), a coil L2, a rectification diode D2, and an output capacitor Co2.

The drain of the output transistor N2 is connected to the input terminal of the input voltage Vi. The source of the output transistor N2 is connected to the first terminal of the coil L2 and to the cathode of the rectification diode D2. The gate of the output transistor N2 is connected to the output terminal of the switching controller 120 (that is, the output terminal of the gate signal S4). The anode of the rectification diode D2 is connected to the ground terminal. The second terminal of the coil L2 is connected to the output terminal of the output voltage Vo and to the first terminal of the output capacitor Co2. The second terminal of the output capacitor Co2 is connected to the ground terminal.

In a case where the switching output stage 110 is of a step-down type, it is preferable to adopt a configuration as shown in FIG. 14 where the coil current IL is detected during the OFF period of the output transistor N2, that is, a configuration where the switching current Is that passes through the rectification diode D2 is taken, as the target of detection. However, this is not meant to exclude a configuration where the coil current IL is detected during the ON period of the output transistor N2.

The switching output stage 110 may adopt, instead of diode rectification, synchronous rectification. In that case, the rectification diode D2 is replaced with a synchronization rectification transistor, and this and the output transistor N2 can be turned ON and OFF complementarily.

As described above, the output type of the switching output stage 110 is not limited to a step-up type as in the first embodiment (FIG. 2) and the second embodiment (FIG. 7), and a step-down type may instead be adopted. Although no illustration is given, the output type of the switching output stage 110 may even be a step-up/down type.

Figure 15:
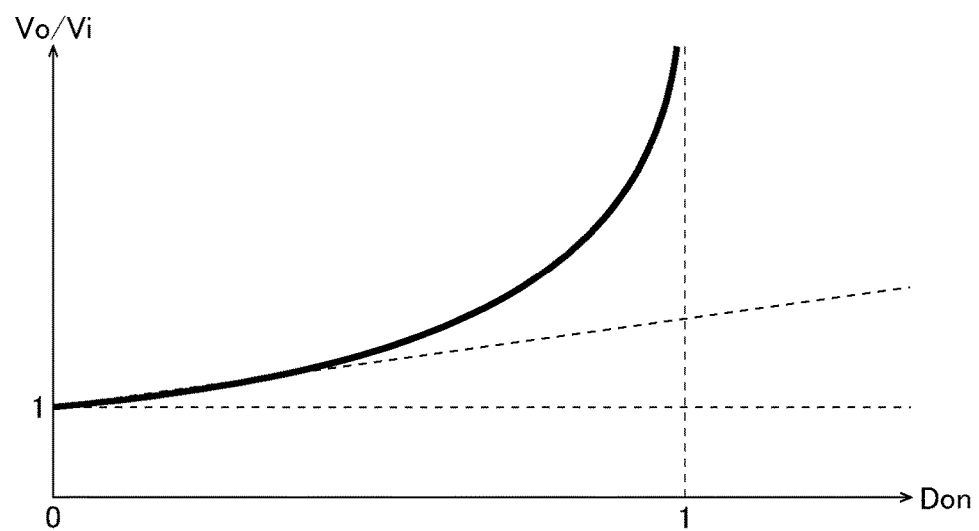
FIG. 15 is a diagram showing a correlation between ON duty and step-up ratio.

ON-Duty and Step-Up Ratio: FIG. 15 is a diagram showing the correlation between the ON duty Don and the step-up ratio (Vo/Vi) in the switching power supply circuit 100 of the first embodiment (FIG. 2). As is well known, in a switching power supply circuit 100 of a step-up type, between the ON duty Don on one hand and the input voltage Vi and the output voltage Vo on the other band, formula (1a) noted below holds. Moreover, rearranging formula (1) permits the step-up ratio (Vo/Vi) to be given by formula (2) noted below.

$$Don=(Vo-Vi)/Vo \quad (1)$$

$$(Vo/V1)=1/(1-Don) \quad (2)$$

From FIG. 15 and formula (2), it is seen that, in the switching power supply circuit 100 of a step-up type, the closer the ON duty Don is to one, the farther the step-up ratio (Vo/Vi) is from being linear.

In the switching power supply circuit 100 of the first embodiment, the gradient of the reference slope voltage V1 (and hence that of the slope voltage Vslp) is fixed. Accordingly, when duty control is performed based on the result of comparison between the error voltage Verr and the slope voltage Vslp, only the error voltage Verr varies so as to fulfill formula (1) noted above. That is, the factors that determine the voltage value of the error voltage Verr include not only the output voltage Vo but also the input voltage Vi.

However, the output feedback loop for generating the error voltage Verr includes the error amplifier 123 and the phase compensator 124, and this makes it difficult to respond to variation of the input voltage Vi properly.

Thus, in applications where the input voltage Vi tends to vary (for example, in battery-operated electronic appliances), the switching power supply circuit 100 may, exhibit poor line regulation characteristics or line step characteristics (line transient characteristics). Here, line regulation characteristics refer to how the output voltage Vo varies in response to continuous, variation of the input voltage Vi. On the other hand, line step characteristics (line transient characteristics) refer to how the output voltage Vo varies in response to discrete (transient) variations in the input voltage Vi. To overcome these inconveniences properly, a fourth embodiment will be proposed below.

Figure 16:
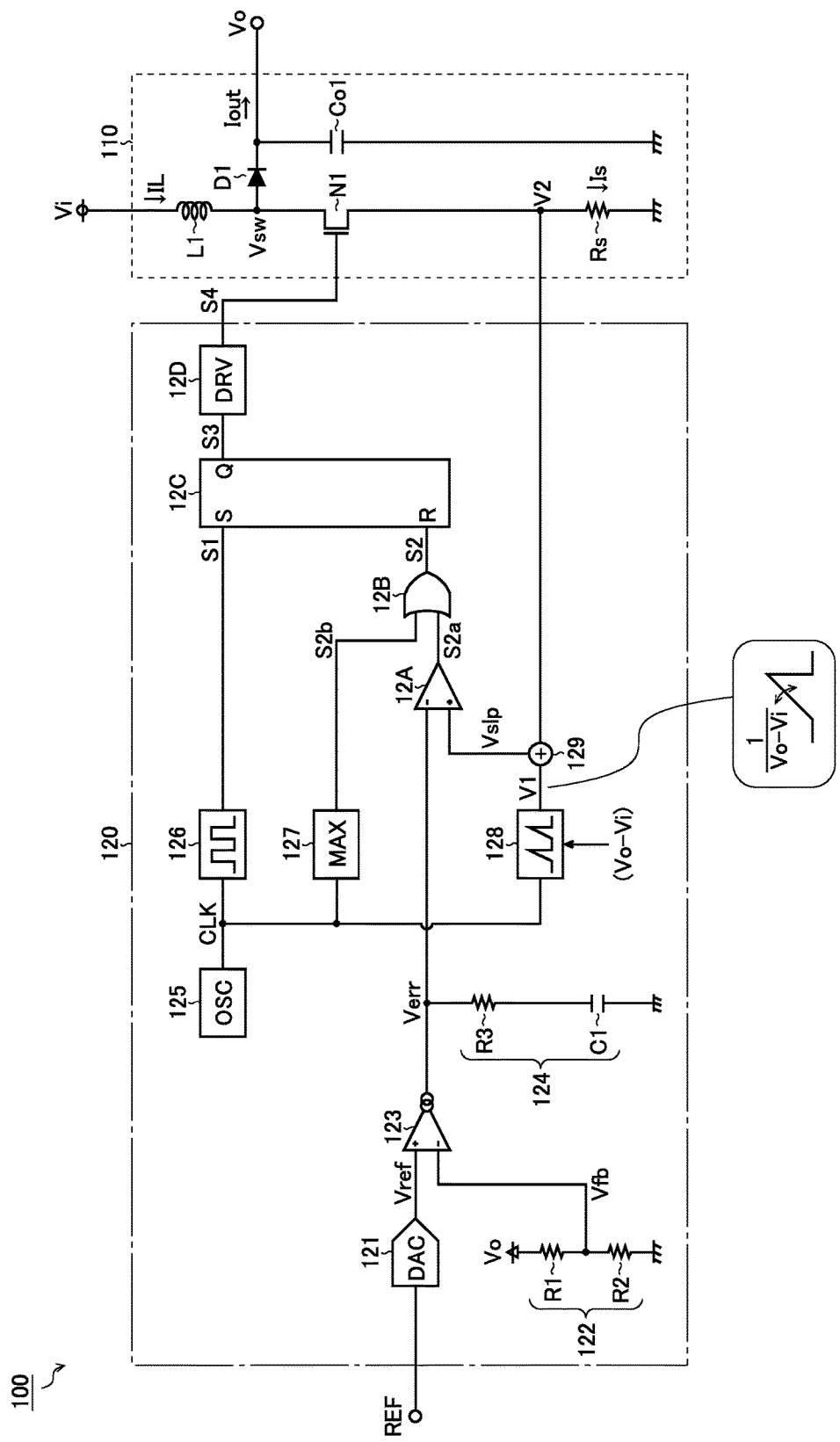
FIG. 16 is a circuit diagram showing a third embodiment of a switching power supply circuit.

Switching Power Supply Circuit (Fourth Embodiment): FIG. 16 is a circuit diagram showing a fourth embodiment of the switching power supply circuit 100. The switching power supply circuit 100 of this embodiment is based on the first embodiment (FIG. 2) described previously, and is characterized in that the reference slope voltage generator 128 includes novel features. Accordingly, such components as find their counterparts in the first embodiment will be identified by the same reference signs as in FIG. 2, and no overlapping description will be repeated. The following description thus focuses on features unique to the second embodiment.

In this embodiment, the reference slope voltage generator 128 receives the difference voltage (Vo−Vi) between the input voltage Vi and the output voltage Vo, and has the function of varying the gradient of the reference slope voltage V1 (and hence that of the slope voltage Vslp) according to the reciprocal (=1/(Vo−V1)) of the difference voltage.

Here, through the function of the output feedback loop described previously, the output voltage Vo is constantly so controlled as to remain equal to the desired target value. Accordingly, to determine the gradient of the reference slope voltage V1, the reference slope voltage generator 128 does not have to refer to the actually observed value of the output voltage Vo; it has only to refer to the previously determined target value of the output voltage Vo.

Figure 17:
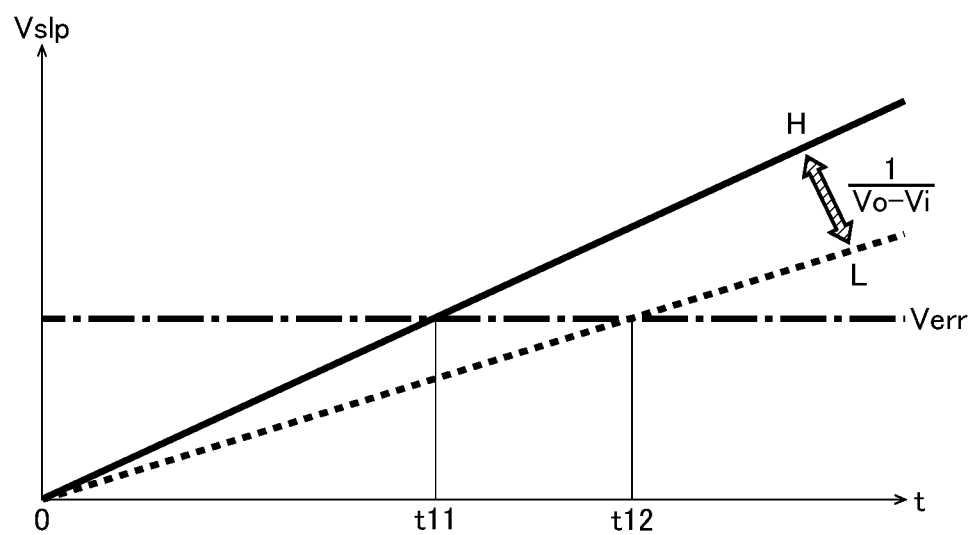
FIG. 17 is a waveform diagram showing operation for adjusting the gradient of a slope voltage.

FIG. 17 is a waveform diagram showing the operation for adjusting the gradient of the slope voltage Vslp. In the diagram, the horizontal axis represents the lapse of time t since the turning ON of the output transistor N1, and the vertical axis represents the voltage of the slope voltage Vslp (solid line and broken line) and the error voltage Verr (dash-and-dot line).

The higher the value of 1/(Vo−Vi), the larger the gradient of the slope voltage Vslp (see the solid line). Accordingly, even when the voltage value of the error voltage Verr is constant, the slope voltage Vslp and the error voltage Verr cross each other with earlier timing (at time point t11). As a result, the ON duty Don of the output transistor N1 becomes lower.

On the other hand, the lower the value of 1/(Vo−Vi), the smaller the gradient of the slope voltage Vslp (see the broken line). Accordingly, even when the voltage value of the error voltage Verr is constant, the slope voltage Vslp and the error voltage Verr cross each other with later timing (at time point t12). As a result, the ON duty Don of the output transistor N1 becomes higher.

Through the operation for adjusting the gradient of the slope voltage Vslp described above, the ON duty Don of the output transistor N1 varies according to 1/(Vo−Vi). That is, in the switching power supply circuit 100 of this embodiment, not only the error voltage Verr, but also the gradient of the slope, voltage Vslp varies so as to fulfill formula (1) noted previously. In particular, through the operation for adjusting the gradient of the slope voltage Vslp, the numerator (Vo−Vi) of formula (1) is canceled out, and only the denominator (Vo) of formula (1) is left behind as the factor that determines the voltage value of the error voltage Verr.

As described above, variation of the input voltage Vi is responded to by the operation for adjusting the gradient of the slope voltage Vslp; thus, in the output feedback loop for generating the error voltage Verr, there is no need to respond to variation of the input voltage Vi. Accordingly, the switching power supply circuit 100 of this embodiment offers enhanced line regulation characteristics and line step characteristics (line transient characteristics), in particular, in applications where the input voltage Vi tends to vary (for example, in battery-operated electronic appliances), an enhancement in those characteristics is important.

Figure 18:
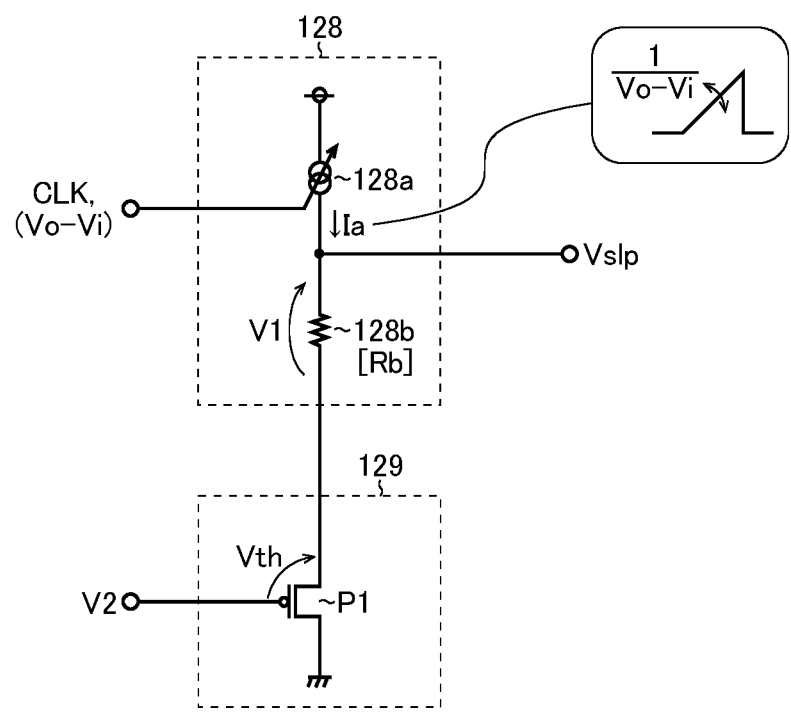
FIG. 18 is a circuit diagram showing one configuration example of a reference slope voltage generator.

Reference Slope Voltage Generator: FIG. 18 is a circuit diagram showing one configuration example of the reference slope voltage generator 128 (and the voltage adder 129). The reference slope voltage generator 128 of this configuration example includes a slope current source 128a and a resistor 128b (with a resistance value Rb), The voltage adder 129 of this configuration example includes a P-channel MOS field-effect transistor P1.

The slope current source 128a is connected between a power terminal and the output terminal of the slope voltage Vslp, and generates a slope current Ia with a sloping waveform in synchronism with the turning ON and OFF of the output transistor N1 (here, the clock signal CLK). The slope current source 128a receives the difference voltage (Vo−Vi) between the input voltage Vi and the output voltage Vo, and has the function of varying the gradient of the slope current Ia according to the reciprocal (=1/(Vo−Vi)) of the difference voltage.

The operation for adjusting the gradient of the slope current Ia can be easily understood by substituting the slope current Ia for the slope voltage Vslp in FIG. 17, Specifically, the higher the value of 1/(Vo−Vi), the larger the gradient of the slope current Ia; reversely, the lower the value of 1/(Vo−Vi) the smaller the gradient of the slope current Ia.

The first terminal of the resistor 128b is connected to the output terminal of the slope voltage Vslp. The second terminal of the resistor 128b is connected to the source of the transistor P1. The drain of the transistor P1 is connected to the ground terminal. To the gate of the transistor P1, a sense voltage V2 is applied. The resistor 128b functions as a current-voltage conversion element that converts the slope current Ia passing through the resistor 128b itself into a reference slope voltage V1(=Ia×Rb).

In the reference slope voltage generator 128 of this configuration example, during the OFF period of the output transistor N1 (V1=Ia×Rb=0, V2=0), the slope voltage Vslp remains at its lower limit value VslpL. The lower limit value VslpL corresponds to the ON threshold voltage Vth of the transistor P1.

On the other hand, during the ON period of the output transistor N1, the slope voltage Vslp has the voltage value (Vth+V1+V2) that equals the lower limit value VslpL plus the reference slope voltage V1 (=Ia×Rb) and the sense voltage V2.

In a case where current mode control is not adopted, the voltage adder 129 may be omitted, in which case the reference slope voltage V1 can be output as the slope voltage Vslp.

Figure 19:
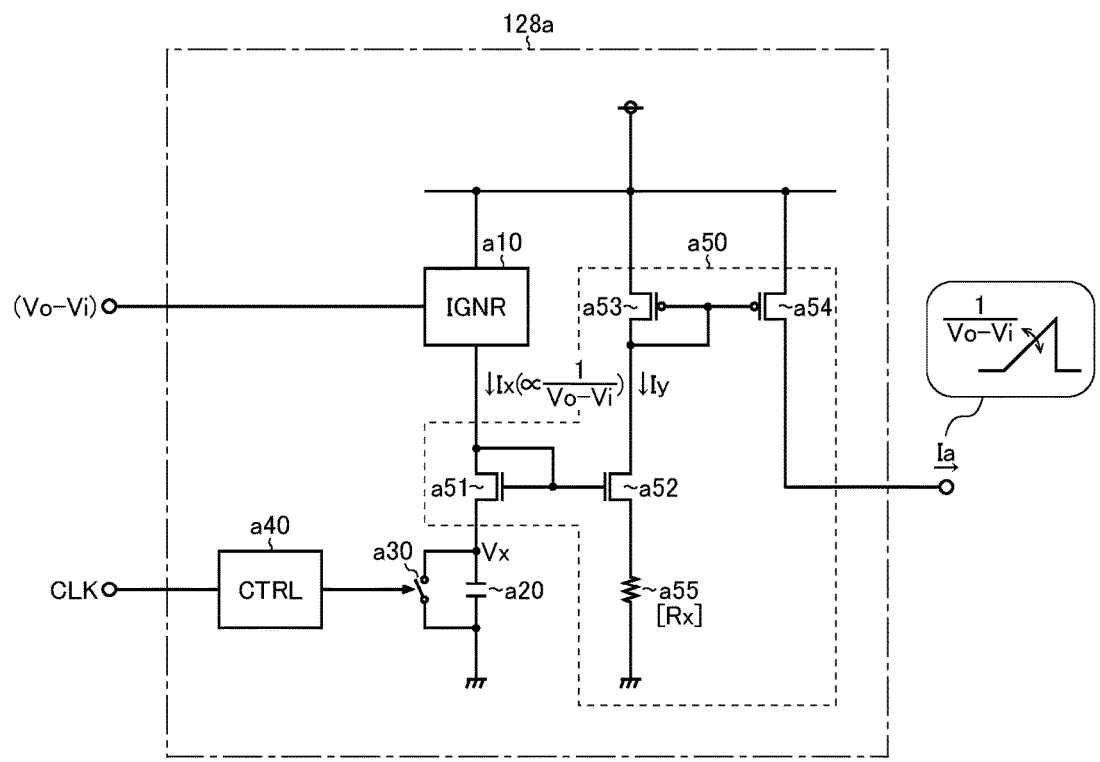
FIG. 19 is a circuit diagram showing one configuration example of a slope current source.

Slope Current Source: FIG. 19 is a circuit diagram showing one configuration example of the slope current source 128a. The slope current source 128a of this configuration example includes a charge current generator a10, a capacitor a20, a charge/discharge switch a30, a charge/discharge controller a40, and a voltage-current converter a50.

The charge current generator a10 is connected between the power terminal and the capacitor a20, and generates a charge current Ix. The charge current generator a10 receives the difference voltage (Vo−Vi) between the input voltage Vi and the output voltage Vo, and has the function of varying the current value of the charge current Ix according to the reciprocal (=1/(Vo−Vi)) of the difference voltage. More specifically, the higher the value of 1/(Vo−Vi), the higher the current value of the charge current reversely, the lower the value of 1/(Vo−Vi), the lower the current value of the charge current Ix.

The capacitor a20 is, connected between the output terminal of the charge current generator a10 and the ground terminal, and is charged by the charge current Ix. When the charge/discharge switch a30 is OFF, the capacitor a20 is charged by the charge current Ix, and thus the charge voltage Vx of the capacitor a20 increases. On the other hand, when the charge/discharge switch a30 is ON, the capacitor a20 is discharged via the charge/discharge switch a30, and thus the charge voltage Vx is reset to a zero value.

The charge/discharge switch a30 is connected across the capacitor a20, and switches between charging and discharging of the capacitor a20 by being turned On and OFF by the charge discharge controller a40.

In synchronism with the turning ON and OFF of the output transistor N1 (here, the clock signal CLK), the charge/discharge controller a40 turns ON and OFF the charge/discharge switch a30. For example, the charge/discharge controller a40 keeps the charge/discharge switch a30 OFF during the ON period of the output transistor N1, and keeps the charge/discharge switch a30 ON during the OFF period of the output transistor N1.

The voltage-current converter a50 includes N-channel MOS field-effect transistors a51 and a52, P-channel MOS field-effect transistors a53 and a54, z resistor a55 (with a resistance value Rx), and converts the charge voltage Vx of the capacitor a20 into the slope current Ia.

The drain of the transistor a51 is connected to the output terminal of the charge on generator a10. The source of the transistor a51 is connected to the application terminal of the charge voltage Vx. The gates of the transistors a51 and a52 are both connected to the drain of the transistor a51. The drain of the transistor a52 is connected to the first terminal of the resistor a55. The second terminal of the resistor a55 is connected to the ground terminal.

The sources of the transistors a53 and a54 are both connected to the power terminal. The gates of the transistors a53 and a54 are both connected to the drain of the transistor a53. The drain of the transistor a53 is connected to the drain of the transistor a52. The drain of the transistor a54 corresponds to the output terminal of the slope current Ia.

In the voltage-current converter a50 of this configuration example, the transistors a51 and a52 constitute a first current mirror, and operate so as to keep their respective drain voltages equal. Thus, at the first terminal of the resistor a55, a voltage equal to the charge voltage Vx of the capacitor a20 appears. Accordingly, through the resistor a55, a reference current Iy (=Vx/Rx) that behaves in a similar manner to the charge voltage Vx passes. On the other hand, the transistors a53 and a54 constitute a second current mirror, and generate the slope current Ia (which is proportional to Iy) by mirroring the reference current Iy.

The higher the value of 1/(Vo−Vi), the higher the current value of the charge current Ix, and the larger the gradient of the charge voltage Vx. This results in a larger gradient of the reference currently, and hence a larger gradient of the slope current Ia. Reversely, the lower the value of 1/(Vo−Vi), the lower the current value of the charge current Ix, and the smaller the gradient of the charge voltage Vx. This results in a smaller gradient of the reference current Iy, and hence a smaller gradient of be slope current Ia.

Figure 20:
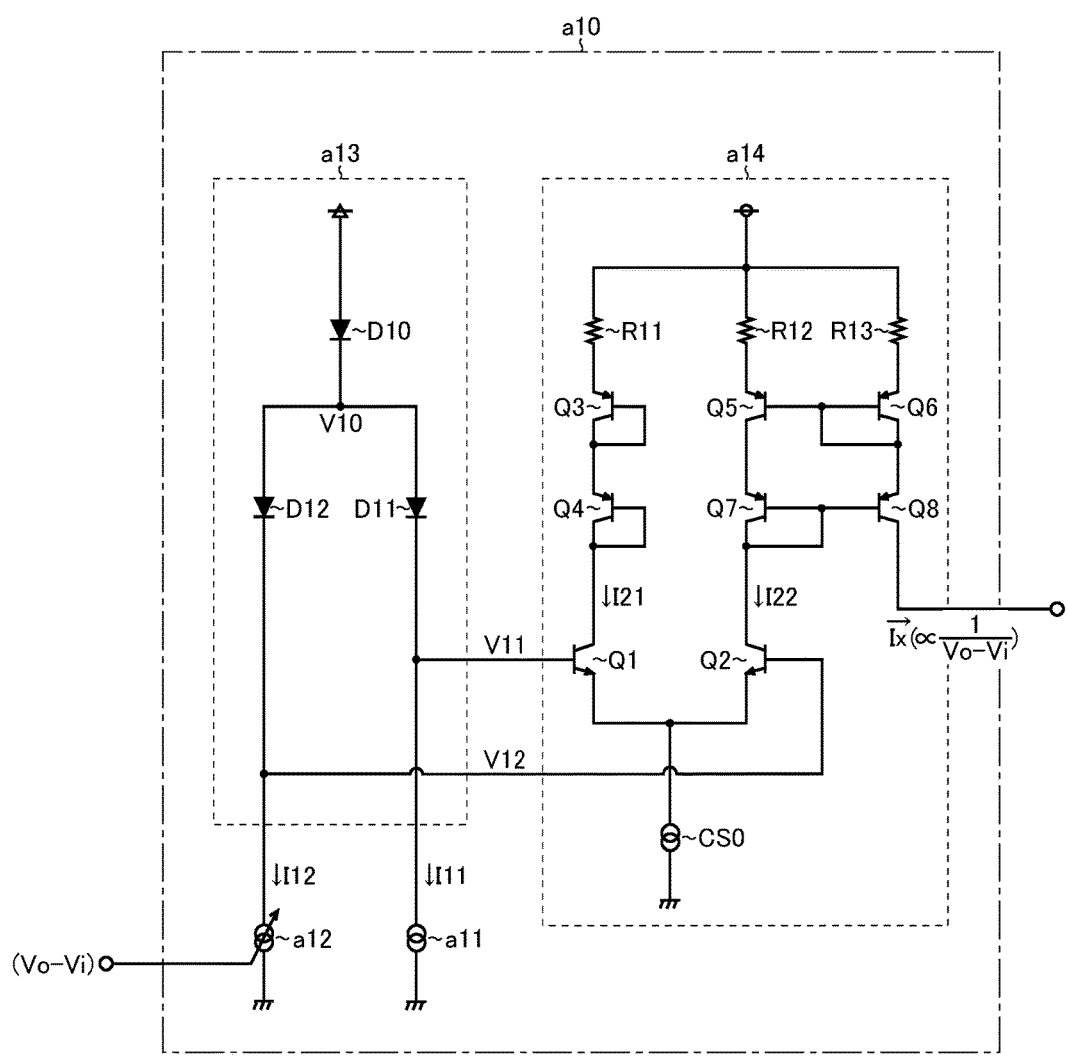
FIG. 20 is a circuit diagram showing one configuration example of a charge current generator.

FIG. 20 as circuit diagram showing one configuration example of the charge current generator a10. The charge current generator a10 of this configuration example is configured as an analog divider that includes current sources a11 and a12, a logarithmic convertor a13, and a transconductance amplifier a14.

The current source a11 generates a predetermined current I11.

The current source a12 receives the difference voltage (Vo−Vi) between the input voltage Vi and the output voltage Vo, and generates a variable current I12 that is proportional to the difference voltage.

The logarithmic converter a13 includes three diodes D10 to D12, and generates logarithmic voltages V11 and V12 by applying logarithmic conversion to the constant current I11 and the variable current I12 respectively. The anode of the diode D10 is connected to the application terminal of a constant voltage. The cathode of the diode D10 is connected to the anodes of the diodes D11 and D12. Between the cathode of the diode D11 and the ground terminal, the current source a11 is connected, and from the cathode of the diode D11, the logarithmic voltage V11 is output. Between the cathode of the diode D12 and the around terminal, the current source a12 is connected, and from the cathode of the diode D12, the logarithmic voltage V12 is output. Thus, the diode D11 corresponds to a first diode which converts the constant current I11 into the logarithmic voltage V11. On the other hand, the diode D12 corresponds to a second diode which converts the variable current into the logarithmic voltage V12.

The transconductance amplifier a14 includes NPN bipolar transistors Q1 and Q2, PNP bipolar transistors Q3 to Q8, resistors R11 to R13, and a current source CS0, and generates the charge current Ix by being fed with differential inputs of the logarithmic voltages V11 and V12.

The base of the transistor Q1 is connected application terminal of the logarithmic age V11. The base of the transistor is connected to the application terminal of the logarithmic voltage V12. The emitters the transistors Q1 and Q2 are connected to the first terminal of the current source CS0. The second terminal of the current source CS0 is connected to the ground terminal.

The first terminal of the resistor R11 is connected to the power terminal. The second terminal of the resistor R11 is connected to the emitter of the transistor Q3. The base and collector of the transistor Q3 are connected to the emitter of the transistor Q4. The base and collector of the transistor Q4 are connected to the collector of the transistor Q1.

The first terminals of the resistors R12 and R13 are connected, to the power terminal. The second terminal of the resistor R12 is connected to the emitter of the transistor Q5. The second terminal of the resistor R13 is connected to the emitter of the transistor Q6. The bases of the transistors Q5 and Q6 are connected to the collector of the transistor Q6. The collector of the transistor Q5 is connected to the emitter of the transistor Q7. The collector of the transistor Q6 is connected to the emitter of the transistor Q8. The bases of the transistors Q7 and Q8 are connected to the collector of the transistor Q2. The collector of the transistor Q7 is connected to the collector of the transistor Q2. The collector of the transistor Q8 corresponds to the output terminal of the charge current Ix.

In the charge current generator a10 of this configuration example, the forward drop voltages Vf across the diodes D11 and D12 exhibit a logarithmic response to the currents that pass through them respectively. Accordingly, when the anode voltage common to the diodes D11 and D12 is represented by V10, then the logarithmic voltages V11 and V12 are given respectively by formulae (3) and (4) noted below. In these formulae, Vt represents the thermal voltage in the diodes D11 and D12, and Is represents the reverse saturation current in the diodes D11 and D12.

$$V11=V10-Vt\cdot\ln(I11/Is) \quad (3)$$

$$V12=V10-Vt\cdot\ln(I12/Is) \quad (4)$$

Moreover, the logarithmic voltages V11 and V12 are, in the form of differential inputs, fed to the transconductance amplifier a14. Here, the difference voltage ΔV between the logarithmic voltages V11 and V12 is given by formula (5) noted below.

$$\Delta V=V12-V11=Vt\cdot\ln(I11/I12) \quad (5)$$

The input stage of the transconductance amplifier a14 is constituted by bipolar transistors Q1 and Q2, and their respective collector currents I21 and I22 exhibit an exponential response to their base voltages. That is, in the transconductance amplifier a14, when the charge current Ix is generated, the difference voltage ΔV is subjected to inverse-logarithmic (anti-logarithmic) conversion.

As a result, the charge current Ix has a current value that is commensurate with the value (I11/I12) obtained by dividing the constant current I11 by the variable current I12. Accordingly, by designing the current sources a11 and a12 such that I12=I11×(Vo−Vi), it is possible to let the current value of the charge current Ix vary according to (1/(Vo−Vi)).

For example, when (Vo−Vi) lowers and the variable current I12 becomes lower than the constant current I11, the logarithmic voltage V12 becomes higher than the logarithmic voltage V11, and the corrector current I22 becomes higher than the collector current I21. Thus, the charge current Ix increases. Reversely, when (Vo−Vi) rises and the variable current I12 becomes higher than the constant current I11, the logarithmic voltage V12 becomes lower than the logarithmic voltage V11, and the corrector current I22 becomes lower than the collector current I21. Thus, the charge current Ix decreases.

Although FIG. 20 deals with, as an example, a configuration where an analog divider is used as a means for performing the division 1/(Vo−Vi), this is not meant to limit the circuit configuration of the analog divider; any other circuit configuration may instead be adopted. Instead of an analog divider, a digital divider may be used.

Although the above description deals with, as an example, a configuration of the reference slope voltage generator 128 where it receives (Vo−Vi) and performs division in it, this is not meant to limit its configuration; it may instead be configured to receive 1/(Vo−Vi) from the beginning.

Figure 21:
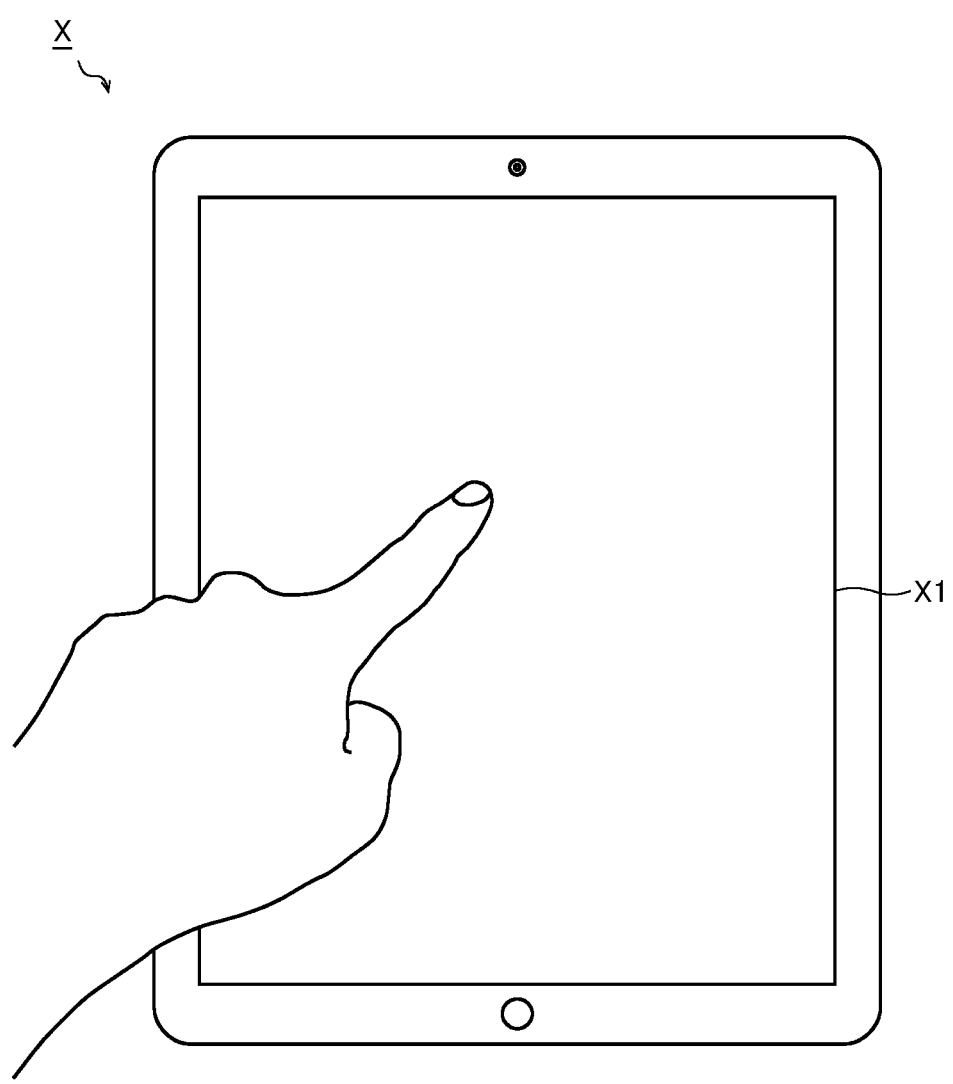
FIG. 21 is an exterior view of a tablet terminal.

Application in Tablet Terminals: FIG. 21 is an exterior view of a tablet terminal. The tablet terminal X has a liquid crystal display X1 furnished with a touch screen function. The liquid crystal display X1 is one example of the liquid crystal display device 1 described above, and as a power supply means in it, the switching power supply circuit 100 described above can be used suitably. However, the target in which the liquid crystal display device 1 can be incorporated is not limited to tablet terminals; it can be incorporated in a variety of electronic appliances (such as notebook personal computers).

Other Modifications: Various technical features disclosed herein can be implemented in any manner other than specifically described above, and allow for many modifications within the spirit of the technical ingenuity involved. That is, it should be understood that the embodiments disclosed herein are in every aspect illustrative and not restrictive, and that the technical scope of the present invention is defined not by the description of embodiments given above but by the scope of the appended claims and encompasses an modification in the sense and scope equivalent to those of the claims.

Industrial Applicability: The switching power supply circuits disclosed herein can be used suitably as power supply means in applications where the load is prone to vary, and as power supply means in applications where the input voltage tends to vary (as in battery-operated electronic appliances).

What is claimed is:

1. A switching power supply circuit comprising:
   a switching output stage configured generate an output voltage from an input voltage by driving a coil current by using an output transistor; and
   a switching controller configured to turn ON and OFF the output transistor to keep the output voltage or a feedback voltage commensurate therewith equal to a predetermined reference voltage,
   wherein the switching controller includes:
      a reference slope voltage generator configured to generate a reference slope voltage;
      a sense voltage holder configured to generate a held sense voltage, which remains constant during a predetermined period, by latching at a predetermined timing a sense voltage, which changes during the predetermined period, commensurate with the coil current; and
      a voltage adder configured to generate a slope voltage by adding up the reference slope voltage and a held sense voltage, wherein the switching controller is configured to determine an ON duty of the output transistor by using the slope voltage, wherein
      the sense voltage holder latches the sense voltage only once per switching period of the output transistor.

2. The switching power supply circuit of claim 1, wherein the sense voltage holder includes: a switch of which a first terminal is connected to an input terminal of the sense voltage and of which a second terminal is connected to an output terminal of the held sense voltage; a capacitor of which a first terminal is connected to the output terminal of the held sense voltage and of which a second terminal is connected to a ground terminal; and a controller configured to turn ON and OFF the switch.

3. The switching power supply circuit of claim 1, wherein the switching controller further includes a clock signal generator configured to generate a clock signal at a predetermined reference frequency, and the sense voltage holder is configured to operate in synchronism with the clock signal.

4. The switching power supply circuit of claim 1, wherein the switching controller further includes; an error amplifier configured to generate an error voltage commensurate with a difference between the feedback voltage and the reference voltage; and a comparator configured to generate a comparison signal by comparing the error voltage with the slope voltage, and the switching controller is configured to determine the ON duty of the output transistor according to the comparison signal.

5. The switching power supply circuit of claim 4, wherein the switching controller further includes: a set signal generator configured to generate a pulse in a set signal with a predetermined pulse period; an RS flip-flop configured to output a pulse width modulation signal by being fed with the set signal and a reset signal commensurate with the comparison signal; and a driver configured to output an ON/OFF control signal for the output transistor by being fed with the pulse width modulation signal.

6. The switching power supply circuit of claim 1, wherein the switching output stage is of one of a step-up type, a step-down type, or a step-up/down type.

7. A load driving device comprising: the switching power supply circuit of claim 1; and a driver configured to drive a load by being fed with electric power from the switching power supply circuit.

8. A liquid crystal display device comprising: the load driving device of claim 7; and a liquid crystal display panel configured to be driven as the load of the load driving device.

9. A switching power supply circuit comprising:
a switching output stage configured generate an output voltage from an input voltage by driving a coil current by using an output transistor; and
a switching controller configured to turn ON and OFF the output transistor to keep the output voltage or a feedback voltage commensurate therewith equal to a predetermined reference voltage,
wherein the switching controller includes:
  a reference slope voltage generator configured to generate a reference slope voltage;
  a sense voltage holder configured to generate a held sense voltage by latching a sense voltage commensurate with the coil current with predetermined timing; and
  a voltage adder configured to generate a slope voltage by adding up the reference slope voltage and a held sense voltage, wherein the switching controller is configured to determine an ON duty of the output transistor by using the slope voltage,
wherein the sense voltage holder includes:
  a first switch of which a first terminal is connected to an input terminal of the sense voltage;
  a second switch of which a first terminal is connected to a second terminal of the first switch and of which a second terminal is connected to an output terminal of the held sense voltage;
  a first capacitor of which a first terminal is connected to the second terminal of the first switch and of which a second terminal is connected to a ground terminal; and
  a second capacitor of which a first terminal is connected to the output terminal of the held sense voltage and of which a second terminal is connected to the ground terminal and a controller configured to turn ON and OFF the first and second switches complementarily.

10. A switching power supply circuit comprising:
a switching output stage configured generate an output voltage from an input voltage by driving a coil current by using an output transistor; and
a switching controller configured to turn ON and OFF the output transistor to keep the output voltage or a feedback voltage commensurate therewith equal to a predetermined reference voltage,
wherein the switching controller includes:
  a reference slope voltage generator configured to generate a reference slope voltage;
  a sense voltage holder configured to generate a held sense voltage by latching a sense voltage commensurate with the coil current with predetermined timing;
  a voltage adder configured to generate a slope voltage by adding up the reference slope voltage and a held sense voltage, wherein the switching controller is configured to determine an ON duty of the output transistor by using the slope voltage;
  an error amplifier configured to generate an error voltage commensurate with a difference between the feedback voltage and the reference voltage;
  a comparator configured to generate a comparison signal by comparing the error voltage with the slope voltage, wherein the switching controller is configured to determine the ON duty of the output transistor according to the comparison signal;
  a set signal generator configured to generate a pulse in a set signal with a predetermined pulse period;
  an RS flip-flop configured to output a pulse width modulation signal by being fed with the set signal and a reset signal commensurate with the comparison signal;
  a driver configured to output an ON/OFF control signal for the output transistor by being fed with the pulse width modulation signal;
  a maximum duty setter configured to generate a pulse in a maximum duty setting signal at a lapse of a maximum ON period since generation of a pulse in the set signal; and
  a logic gate configured to generate the reset signal by logically synthesizing together the comparison signal and the maximum duty setting signal.

* * * * *